(12) United States Patent
Wnek

(10) Patent No.: US 7,844,566 B2
(45) Date of Patent: Nov. 30, 2010

(54) LATENT SEMANTIC CLUSTERING

(75) Inventor: Janusz Wnek, Germantown, MD (US)

(73) Assignee: Content Analyst Company, LLC, Reston, VA (US)

( * ) Notice: Subject to any disclaimer, the term of this patent is extended or adjusted under 35 U.S.C. 154(b) by 856 days.

(21) Appl. No.: 11/431,664

(22) Filed: May 11, 2006

(65) Prior Publication Data

US 2006/0242140 A1    Oct. 26, 2006

Related U.S. Application Data

(63) Continuation-in-part of application No. 11/262,735, filed on Nov. 1, 2005, now abandoned.

(60) Provisional application No. 60/680,489, filed on May 13, 2005, provisional application No. 60/674,706, filed on Apr. 26, 2005.

(51) Int. Cl.
*G06N 5/00*    (2006.01)

(52) U.S. Cl. .......................... 706/55; 706/45

(58) Field of Classification Search .................. 382/187; 706/10, 45, 55
See application file for complete search history.

(56) References Cited

U.S. PATENT DOCUMENTS

| | | | |
|---|---|---|---|
| 4,839,853 A | 6/1989 | Deerwester et al. | |
| 5,301,109 A | 4/1994 | Landauer et al. | |
| 5,745,602 A | 4/1998 | Chen et al. | |
| 5,787,422 A | 7/1998 | Tukey et al. | |
| 5,819,258 A | 10/1998 | Vaithyanathan et al. | |
| 5,838,819 A * | 11/1998 | Ruedisueli et al. | .......... 382/187 |
| 5,857,179 A | 1/1999 | Vaithyanathan et al. | |
| 5,926,812 A | 7/1999 | Hilsenrath et al. | |
| 5,963,940 A | 10/1999 | Liddy et al. | |
| 5,987,446 A | 11/1999 | Corey et al. | |
| 5,999,927 A | 12/1999 | Tukey et al. | |
| 6,041,323 A | 3/2000 | Kubota | |
| 6,233,575 B1 | 5/2001 | Agrawal et al. | |

(Continued)

OTHER PUBLICATIONS

Osinski, An Algorithm for Clustering of Web Search Results, Masters Thesis, Poznan University of Technology, Poland, 2003, pp. 1-91.*

(Continued)

*Primary Examiner*—Wilbert L Starks, Jr.
(74) *Attorney, Agent, or Firm*—Sterne, Kessler, Goldstein & Fox P.L.L.C.

(57) ABSTRACT

An embodiment of the present invention provides a computer-based method for automatically identifying clusters of conceptually-related documents in a collection of documents, including the following steps: generating a document-representation of each document in an abstract mathematical space; identifying a plurality of document clusters in the collection of documents based on a conceptual similarity between respective pairs of the document-representations, wherein each document cluster is associated with an exemplary document and a plurality of other documents; and identifying a non-intersecting document cluster from among the plurality of document clusters based on (i) a conceptual similarity between the document-representation of the exemplary document and the document-representation of each document in the non-intersecting cluster and (ii) a conceptual dissimilarity between a cluster-representation of the non-intersecting document cluster and a cluster-representation of each other document cluster. Variants of the method enable creating hierarchy of clusters and conducting incremental updates of preexisting hierarchical structures.

8 Claims, 20 Drawing Sheets

U.S. PATENT DOCUMENTS

| | | | |
|---|---|---|---|
| 6,263,335 | B1 | 7/2001 | Paik et al. |
| 6,289,353 | B1 | 9/2001 | Hazlehurst et al. |
| 6,347,314 | B1 | 2/2002 | Chidlovskii |
| 6,349,309 | B1 | 2/2002 | Aggarwal et al. |
| 6,446,061 | B1 | 9/2002 | Doerre et al. |
| 6,480,843 | B2 | 11/2002 | Li |
| 6,510,406 | B1 | 1/2003 | Marchisio |
| 6,519,586 | B2 | 2/2003 | Anick et al. |
| 6,523,026 | B1 | 2/2003 | Gillis |
| 6,564,197 | B2 | 5/2003 | Sahami et al. |
| 6,625,585 | B1 * | 9/2003 | MacCuish et al. ............. 706/10 |
| 6,654,739 | B1 | 11/2003 | Apte et al. |
| 6,678,679 | B1 | 1/2004 | Bradford |
| 6,684,205 | B1 | 1/2004 | Modha et al. |
| 6,687,696 | B2 | 2/2004 | Hofmann et al. |
| 6,775,677 | B1 | 8/2004 | Ando et al. |
| 6,778,979 | B2 | 8/2004 | Grefenstette et al. |
| 6,820,075 | B2 | 11/2004 | Shanahan et al. |
| 6,925,460 | B2 | 8/2005 | Kummamuru et al. |
| 6,928,425 | B2 | 8/2005 | Grefenstette et al. |
| 7,024,400 | B2 | 4/2006 | Tokuda et al. |
| 7,024,407 | B2 | 4/2006 | Bradford |
| 7,113,943 | B2 | 9/2006 | Bradford et al. |
| 7,137,062 | B2 | 11/2006 | Kaufman et al. |
| 7,185,001 | B1 | 2/2007 | Burdick et al. |
| 2001/0037324 | A1 | 11/2001 | Agrawal et al. |
| 2002/0103799 | A1 | 8/2002 | Bradford et al. |
| 2003/0037251 | A1 | 2/2003 | Frieder et al. |
| 2003/0088480 | A1 | 5/2003 | Berghofer et al. |
| 2003/0088581 | A1 | 5/2003 | Maze et al. |

OTHER PUBLICATIONS

Dhillon, et al, Concept Decompositions for Large Sparse Text Data Using Clustering, Machine Learning, vol. 42, Issue 1-2, Jan. 2001, pp. 143-175.*

Muresan, Using Document Clustering and Language Modelling in Mediated Information Retrieval, Doctoral Thesis, Rutgers Univ., 2002, pp. 1-265.*

Osinski, An Algorithm for Clustering of Web Search Results, Masters Thesis, Poznan University of Technology, Poland, 2003, pp. 1-91.*

P.F. Brown, et al., "The Mathematics of Statistical Machine Translation: Parameter Estimation," 19 Computational Linguistics 263 (1993).

Klebanov, B., and Wiemer-Hastings, P., 2002, "Using LSA for Pronominal Anaphora Resolution," in Gelbukh, A. (ed.) Computational Linguistics and Intelligent Text Processing, LNCS 2276, Springer Verlag, pp. 197-199.

Deerwester, S., et al., "Indexing by Latent Semantic Analysis," Journal of the American Society for Information Science, 41(6), pp. 391-407, Oct. 1990.

Ding, C., A Similarity-based Probability Model for Latent Semantic Indexing, Proceedings of the 22nd Annual SIGIR Conference, Berkeley, Calif., Aug. 1999.

Marchisio, G., and Liang, J., "Experiments in Trilingual Cross-language Information Retrieval," Proceedings, 2001 Symposium on Document Image Understanding Technology, Columbia, MD, 2001, pp. 169-178.

Hoffman, T., "Probabilistic Latent Semantic Indexing," Proceedings of the 22nd Annual SIGIR Conference, Berkeley, CA, 1999, pp. 50-57.

Kolda, T., and O.Leary, D., "A Semidiscrete Matrix Decomposition for Latent Semantic Indexing in Information Retrieval," ACM Transactions on Information Systems, vol. 16 , Issue 4 (Oct. 1998), pp. 322-346.

Landauer, T., et al., in "Learning Human-Like Knowledge by Singular Value Decomposition: A Progress Report," in M.I. Jordan, MJ. Kearns and S.A. Solla (Eds.), Advances in Neural Information Processing Systems 10, Cambridge: MIT Press, pp. 45-51 (1998).

William H. Press et al., "Numerical Recipes," The Art of Scientific Computing, Chapter 2, pp. 52-64, Cambridge University Press, 1986.

D. Arnold et al., "Machine Translation," Chapter 6, pp. 111-128, Blackwell Publishers, Cambridge, MA, 1994.

Teuvo Kohonen, "Self-Organizing Maps," Third Edition, Springer-Verlag Berlin Heidelberg, New York, pp. 105-115 and 191-194.

Pavel Berkhin, "Survey of Clustering Data Mining Techniques," Accrue Software, Inc., pp. 1-56, printed from [http://citeseer.ist.psu.edu/berkin02survey.html] on Oct. 2, 2006.

Korfhage, R., "Information Storage and Retrieval", Section 5.7, Document Similarity, pp. 125-133, Wiley and Sons, 1997.

Landuer, T., et al., "An Introduction to Latent Semantic Analysis, Discourse Processes", vol. 25, 1998, pp. 259-284.

Dumais, S., "LSI Meets TREC: A Status Report", in: D. Harman (Ed.), The First Text Retrieval Conference (TRECI), National Institute of Standards and Technology Special Publication #500-207, 1993, pp. 137-152. Available at website: http://lsi.argreenhouse.com/~remde/lsi/LSIpapers.html.

Dumais, S., "Latent Semantic Indexing (LSI) and TREC-2", in: D. Harman (Ed.), The Second Text Retrieval Conference (TREC2), National Institute of Standards and Technology Special Publication #500-215, 1994, pp. 105-116. Available at website: http://lsi.argreenhouse.com/~remde/lsi/LSIpapers.html.

Dumais, S., "Latent Semantic Indexing (LSI) and TREC-3 Report", in: D. Harman (Ed.), The Third Text Retrieval Conference (TREC3), National Institute of Standards and Technology Special Publication #500-226, 1995. Available at website: http://lsi.argreenhouse.com/~remde/lsi/LSIpapers.html.

Dumais, S., et al., "Automatic Cross-Language Retrieval Using Latent Semantic Indexing", in AAAI Spring Symposium on Cross-Language Text and Speech Retrieval, Mar. 1997.

International Search Report for International Application No. PCT/US05/23912, filed Jun. 30, 2005.

Susan T. Dumais, "Latent Semantic Analysis," Annual Review of Information Science and Technology, vol. 38, Information Today, Inc., Medford, New Jersey, 2004, pp. 189-230.

* cited by examiner

|     | d1  | d2 | d3 | d4 | d5 | d6 | d7 | d8 | d9 | d10 |
|-----|-----|----|----|----|----|----|----|----|----|-----|
| d1  | 100 | 5  | 91 | 50 | 67 | 11 | 22 | 25 | 17 | 0   |
| d2  |     |    |    |    |    |    |    |    |    |     |
| d3  |     |    |    |    |    |    |    |    |    |     |
| d4  |     |    |    |    |    |    |    |    |    |     |
| d5  |     |    |    |    |    |    |    |    |    |     |
| d6  |     |    |    |    |    |    |    |    |    |     |
| d7  |     |    |    |    |    |    |    |    |    |     |
| d8  |     |    |    |    |    |    |    |    |    |     |
| d9  |     |    |    |    |    |    |    |    |    |     |
| d10 |     |    |    |    |    |    |    |    |    |     |

FIG. 7A

|     | d1  | d2  | d3 | d4 | d5 | d6 | d7 | d8 | d9 | d10 |
|-----|-----|-----|----|----|----|----|----|----|----|-----|
| d1  | 100 | 5   | 91 | 50 | 67 | 11 | 22 | 25 | 17 | 0   |
| d2  | 5   | 100 | 1  | 3  | 5  | 27 | 2  | 7  | 5  | 9   |
| d3  |     |     |    |    |    |    |    |    |    |     |
| d4  |     |     |    |    |    |    |    |    |    |     |
| d5  |     |     |    |    |    |    |    |    |    |     |
| d6  |     |     |    |    |    |    |    |    |    |     |
| d7  |     |     |    |    |    |    |    |    |    |     |
| d8  |     |     |    |    |    |    |    |    |    |     |
| d9  |     |     |    |    |    |    |    |    |    |     |
| d10 |     |     |    |    |    |    |    |    |    |     |

FIG. 7B

|     | d1  | d2  | d3 | d4 | d5 | d6  | d7 | d8 | d9 | d10 |
|-----|-----|-----|----|----|----|-----|----|----|----|-----|
| d1  | 100 | 5   | 91 | 50 | 67 | 11  | 22 | 25 | 17 | 0   |
| d2  | 5   | 100 | 1  | 3  | 5  | 27  | 2  | 7  | 5  | 9   |
| d3  |     |     |    |    |    |     |    |    |    |     |
| d4  |     |     |    |    |    |     |    |    |    |     |
| d5  |     |     |    |    |    |     |    |    |    |     |
| d6  | 11  | 27  | 2  | 4  | 6  | 100 | 88 | 3  | 52 | 59  |
| d7  |     |     |    |    |    |     |    |    |    |     |
| d8  |     |     |    |    |    |     |    |    |    |     |
| d9  |     |     |    |    |    |     |    |    |    |     |
| d10 |     |     |    |    |    |     |    |    |    |     |

FIG. 7C

|    | d1  | d2  | d3 | d4 | d5 | d6  | d7 | d8  | d9 | d10 |
|----|-----|-----|----|----|----|-----|----|-----|----|-----|
| d1 | 100 | 5   | 91 | 50 | 67 | 11  | 22 | 25  | 17 | 0   |
| d2 | 5   | 100 | 1  | 3  | 5  | 27  | 2  | 7   | 5  | 9   |
| d3 |     |     |    |    |    |     |    |     |    |     |
| d4 |     |     |    |    |    |     |    |     |    |     |
| d5 |     |     |    |    |    |     |    |     |    |     |
| d6 | 11  | 27  | 2  | 4  | 6  | 100 | 88 | 3   | 52 | 59  |
| d7 |     |     |    |    |    |     |    |     |    |     |
| d8 | 25  | 7   | 55 | 25 | 48 | 3   | 39 | 100 | 24 | 26  |
| d9 |     |     |    |    |    |     |    |     |    |     |
| d10|     |     |    |    |    |     |    |     |    |     |

FIG. 7D

|    | d1  | d2  | d3 | d4 | d5 | d6  | d7 | d8  | d9 | d10 |
|----|-----|-----|----|----|----|-----|----|-----|----|-----|
| d1 | 100 | 5   | 91 | 50 | 67 | 11  | 22 | 25  | 17 | 0   |
| d2 | 5   | 100 | 1  | 3  | 5  | 27  | 2  | 7   | 5  | 9   |
| d3 |     |     |    |    |    |     |    |     |    |     |
| d4 |     |     |    |    |    |     |    |     |    |     |
| d5 |     |     |    |    |    |     |    |     |    |     |
| d6 | 11  | 27  | 2  | 4  | 6  | 100 | 88 | 3   | 52 | 59  |
| d7 |     |     |    |    |    |     |    |     |    |     |
| d8 | 25  | 7   | 55 | 25 | 48 | 3   | 39 | 100 | 24 | 26  |
| d9 |     |     |    |    |    |     |    |     |    |     |
| d10|     |     |    |    |    |     |    |     |    |     |

FIG. 7E

LATENT SEMANTIC CLUSTERING

CROSS REFERENCE TO RELATED APPLICATIONS

This application claims benefit under 35 U.S.C. §119(e) to U.S. Provisional Patent Application 60/680,489, entitled "Latent Semantic Clustering," to Wnek, filed on May 13, 2005. This application is also a continuation-in-part of U.S. patent application Ser. No. 11/262,735, entitled "Generating Representative Exemplars for Indexing, Clustering, Categorization and Taxonomy," to Wnek and filed Nov. 1, 2005, which claims benefit under 35 U.S.C. §119(e) to U.S. Provisional Patent Application 60/674,706, entitled "Generating Representative Exemplars for Indexing, Clustering, Categorization, and Taxonomy," to Wnek, filed on Apr. 26, 2005. The entirety of each of the foregoing applications is hereby incorporated by reference as if fully set forth herein.

BACKGROUND OF THE INVENTION

1. Field of the Invention

The present invention is generally directed to the field of automated document processing.

2. Background

In the current Information Age, documents are being produced at a rate that far exceeds an individual's ability to process them. For many reasons, however, it is important that these documents be analyzed and/or organized into a conceptually coherent structure. For example, the documents may be of military or economic significance. Failure to analyze and/or organize such documents could be detrimental to national security, could lead to economic loss, or both. As a result, classification systems have been developed to help analyze and/or organize the vast amount of documents that are continually produced. Such classification systems are typically based on a pre-determined classification scheme.

However, the challenge of analyzing the large amounts of information contained in these documents is multiplied by a variety of circumstances, locations and changing identities among the entities involved. Consequently, it is not feasible to build a pre-determined classification scheme capable of meeting all current needs. Constant adaptation is required to accommodate new information as it becomes available. A pre-determined classification scheme does not allow for such adaptation.

Given the foregoing, what is needed then is an automated classification system for detecting new patterns and for providing a specific and understandable organization of input information. Such an automated classification system should learn patterns in an unsupervised fashion and organize its knowledge in a comprehensive way.

BRIEF SUMMARY OF THE INVENTION

In accordance with an embodiment of the present invention there is provided an automated classification system for detecting new patterns and for providing a specific and understandable organization of input information. This classification system can learn patterns in an unsupervised fashion and organize its knowledge in a comprehensive way.

Accordingly, an embodiment of the present invention provides a computer-based method for automatically identifying clusters of conceptually-related documents in a collection of documents. The method includes the following steps. First, a document-representation of each document is generated in an abstract mathematical space. Second, a plurality of document clusters in the collection of documents is identified based on a conceptual similarity between respective pairs of the document-representations. Each document cluster is associated with an exemplary document and a plurality of other documents. Then, a non-intersecting document cluster is identified from among the plurality of document clusters based on the following factors: (i) a conceptual similarity between the document-representation of the exemplary document and the document-representation of each document in the non-intersecting cluster; and (ii) a conceptual dissimilarity between a cluster-representation of the non-intersecting document cluster and a cluster-representation of each other document cluster.

Another embodiment of the present invention provides a computer program product for automatically identifying clusters of conceptually-related documents in a collection of documents. The computer program product includes a computer usable medium having computer readable program code means embodied in the medium for causing an application program to execute on an operating system of a computer. The computer readable program code means includes a computer readable first program codes means, a computer readable second program codes means and a computer readable third program code means.

The computer readable first program code means includes means for generating a document-representation of each document in an abstract mathematical space. In an example, the document-representation is generated in a Latent Semantic Indexing (LSI) space.

The computer readable second program code means includes means for identifying a plurality of document clusters in the collection of documents based on a conceptual similarity between respective pairs of the document-representations, wherein each document cluster includes an exemplary document and a plurality of other documents. In an example in which the document-representation is generated in an LSI space, the conceptual similarity is a cosine similarity.

The computer readable third program code means includes means for identifying a non-intersecting document cluster from among the plurality of document clusters. The non-intersecting document cluster is identified based on the following factors: (i) a conceptual similarity between the document-representation of the exemplary document and the document-representation of each document in the non-intersecting cluster; and (ii) a conceptual dissimilarity between a cluster-representation of the non-intersecting document cluster and a cluster-representation of each other document cluster.

A further embodiment of the present invention provides a computer-based method for automatically identifying clusters of conceptually-related documents in a collection of documents. The method includes the following steps. First, a document-representation of each document is generated in an abstract mathematical space. Second, a plurality of document clusters in the collection of documents is identified based on a conceptual similarity between respective pairs of the document-representations, wherein each document cluster includes a plurality of documents. Third, an intra-cluster conceptual similarity is computed for each document cluster based on the document-representations of the plurality of documents included in each document cluster. Fourth, inter-cluster conceptual dissimilarities are computed between pairs of document clusters in the plurality of document clusters. Then, a non-intersecting document cluster is identified from among the plurality of document clusters based on: (i) the intra-cluster conceptual similarities and (ii) the inter-cluster conceptual dissimilarities.

A further embodiment of the present invention provides a computer-based method for automatically organizing documents in a collection of documents into clusters of documents. The method includes the following steps. A representation of each document is generated in an abstract mathematical space. A similarity is measured between the representation of each document in the collection of documents and the representation of at least one other document in the collection of documents. Each document in the collection of documents is labeled with a first mapping or a second mapping based on the similarity measurements. Then, the documents are organized into clusters based on the mappings.

A further embodiment of the present invention provides a computer program product for automatically organizing documents in a collection of documents into clusters of documents. The computer program product includes a computer usable medium having computer readable program code embodied in the medium for causing an application program to execute on an operating system of a computer. The computer readable program code includes a computer readable first, second, third, and fourth program code. The computer readable first program code causes the computer to generate a representation of each document in an abstract mathematical space. The computer readable second program code causes the computer to measure a similarity between the representation of each document in the collection of documents and the representation of at least one other document in the collection of documents. The computer readable third program code causes the computer to label each document in the collection of documents with a first mapping or a second mapping based on the similarity measurements. The computer readable fourth program code causes the computer to organize the documents into clusters based on the mappings.

Embodiments of the present invention provide several advantages, capabilities and opportunities. For example, an embodiment of the present invention: (i) creates a set of specific, non-intersecting document clusters that represent specific and non-intersecting concepts described by a collection of documents; (ii) does not require specification of the number of clusters to be constructed; and (iii) is scalable, as it does not require constructing large document similarity matrices.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 4:
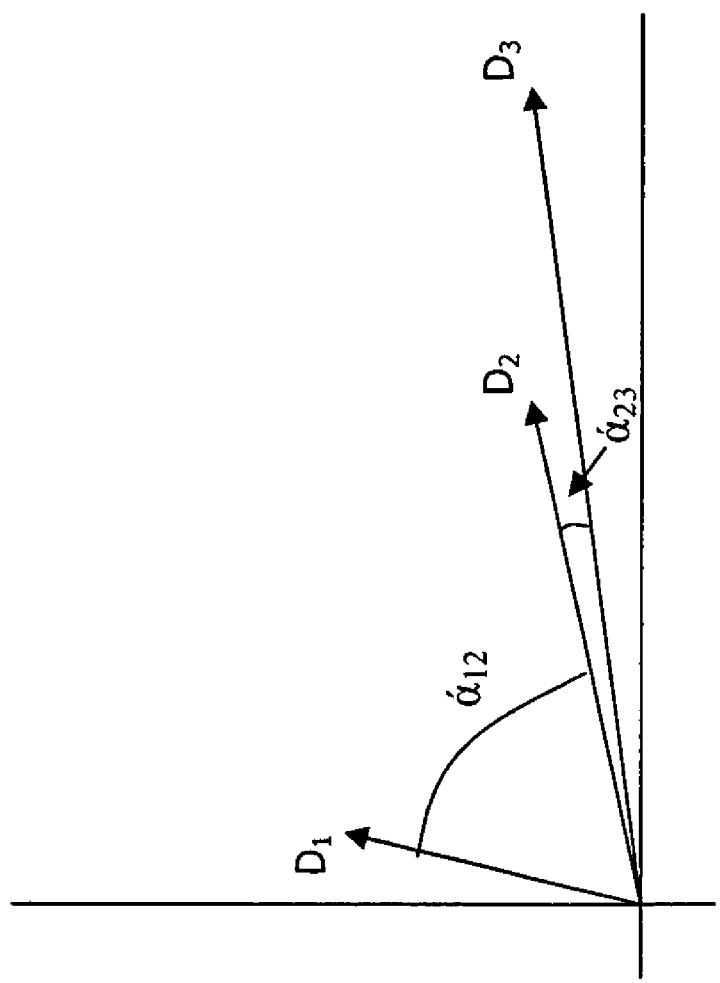

FIG. 4 geometrically illustrates a manner in which to measure the similarity between two documents in accordance with an embodiment of the present invention.

Figure 5A:
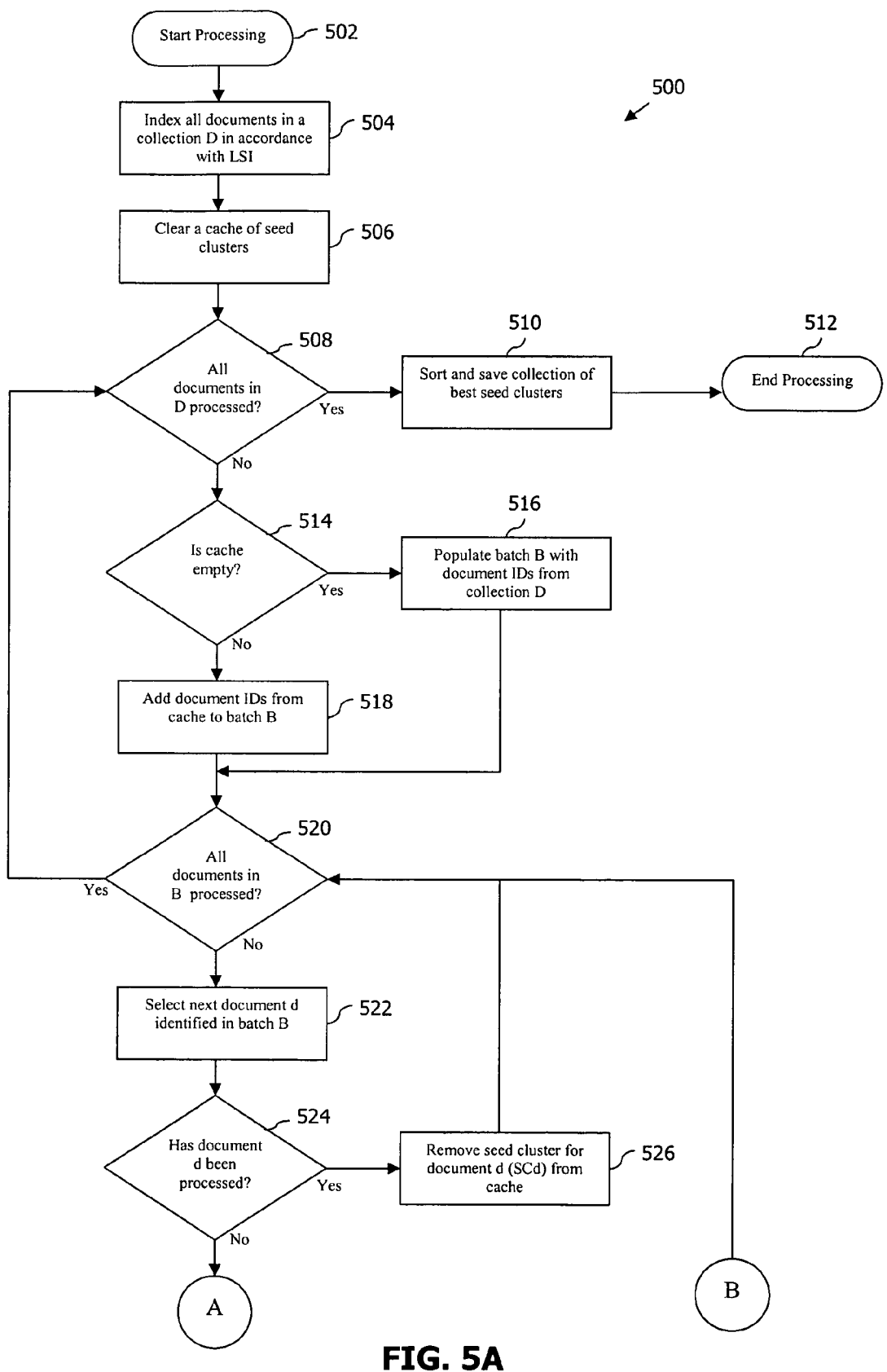
Figure 5B:
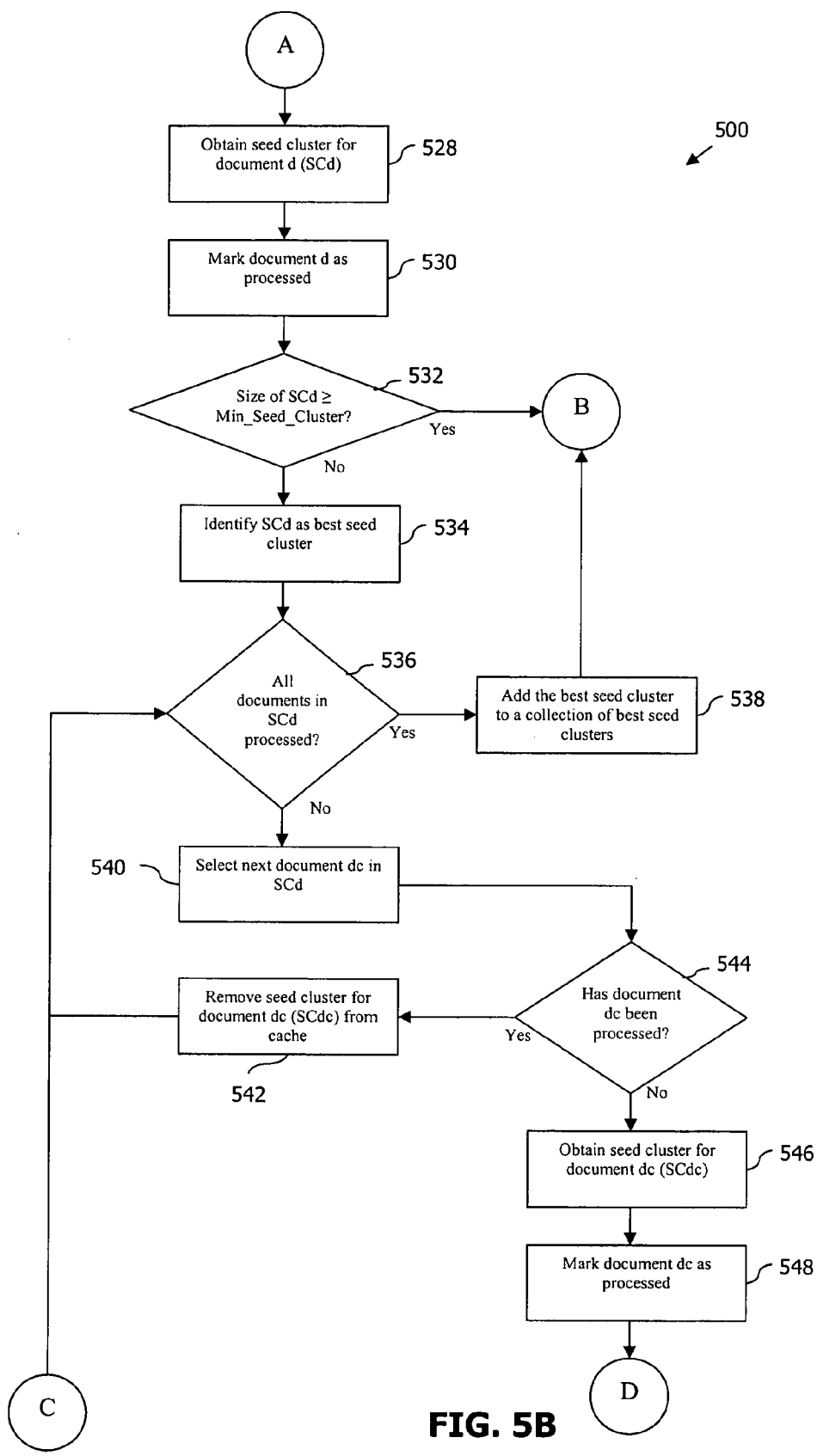
Figure 5C:
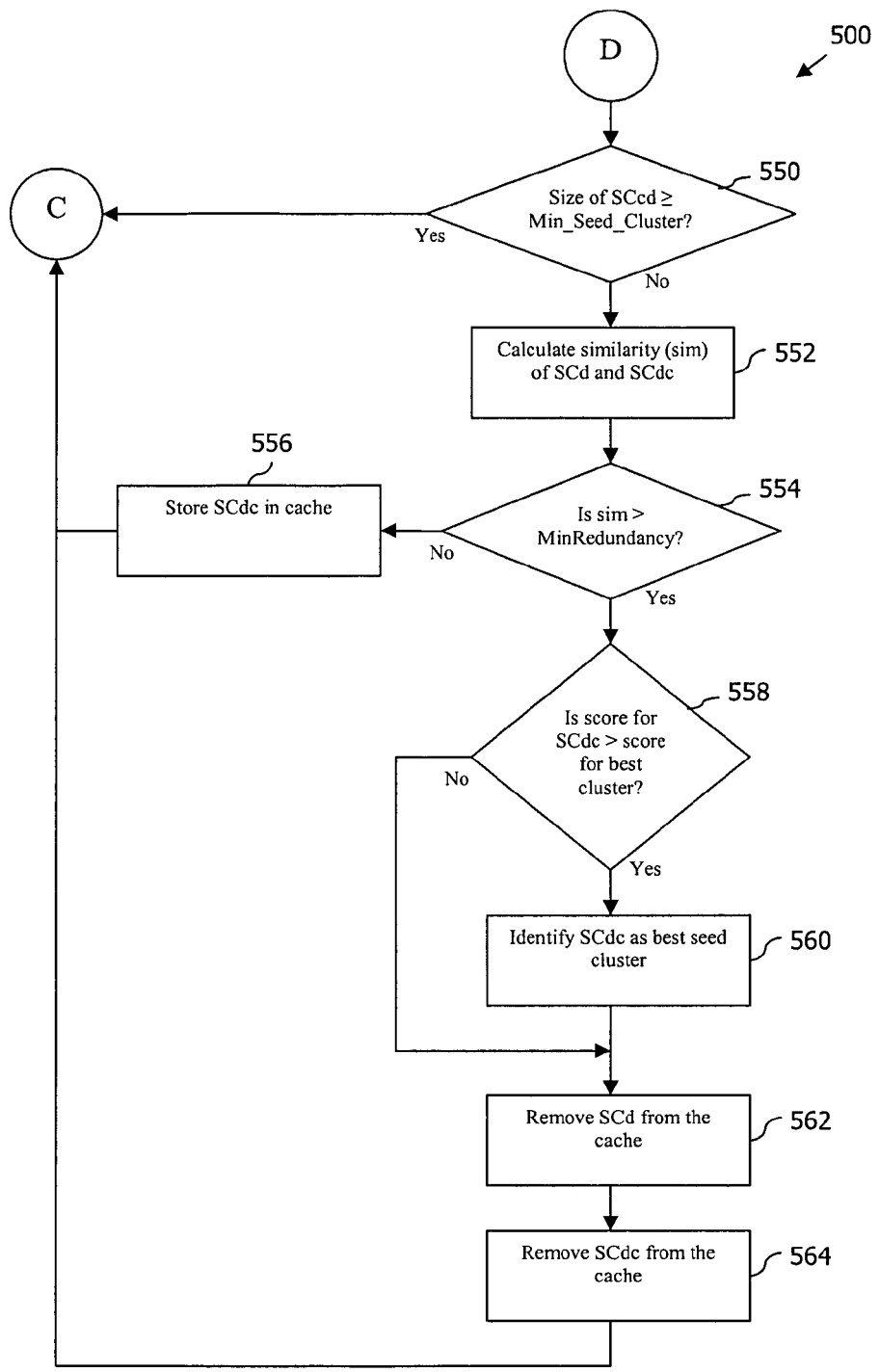

FIGS. 5A, 5B and 5C jointly depict a flowchart of a method for automatically selecting high utility seed exemplars from a collection of documents in accordance with an embodiment of the present invention.

Figure 6:
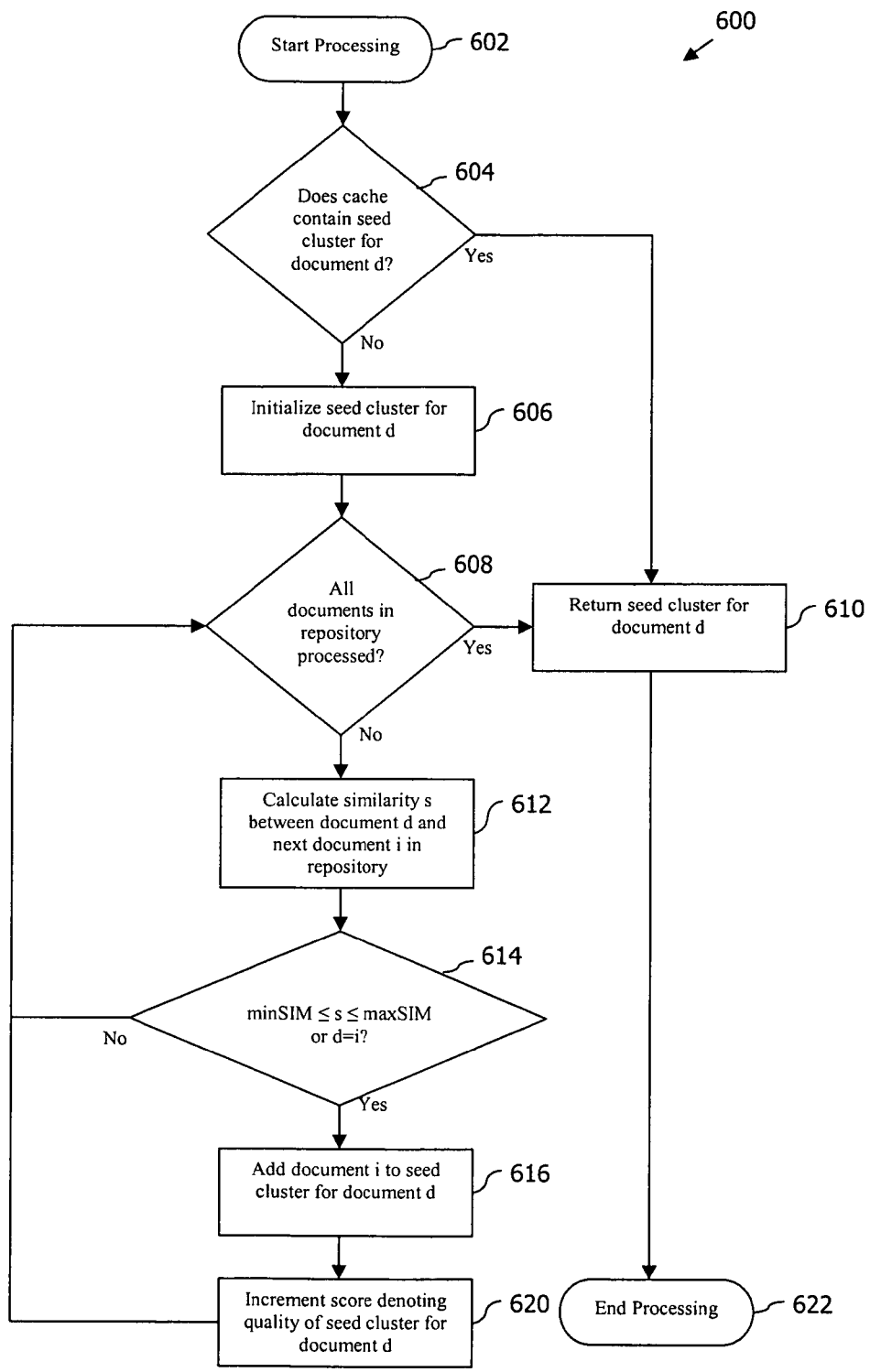

FIG. 6 depicts a flowchart of a method for obtaining a seed cluster for a document in accordance with an embodiment of the present invention.

FIGS. 7A, 7B, 7C, 7D and 7E present tables that graphically demonstrate the application of a method in accordance with an embodiment of the present invention.

Figure 8:
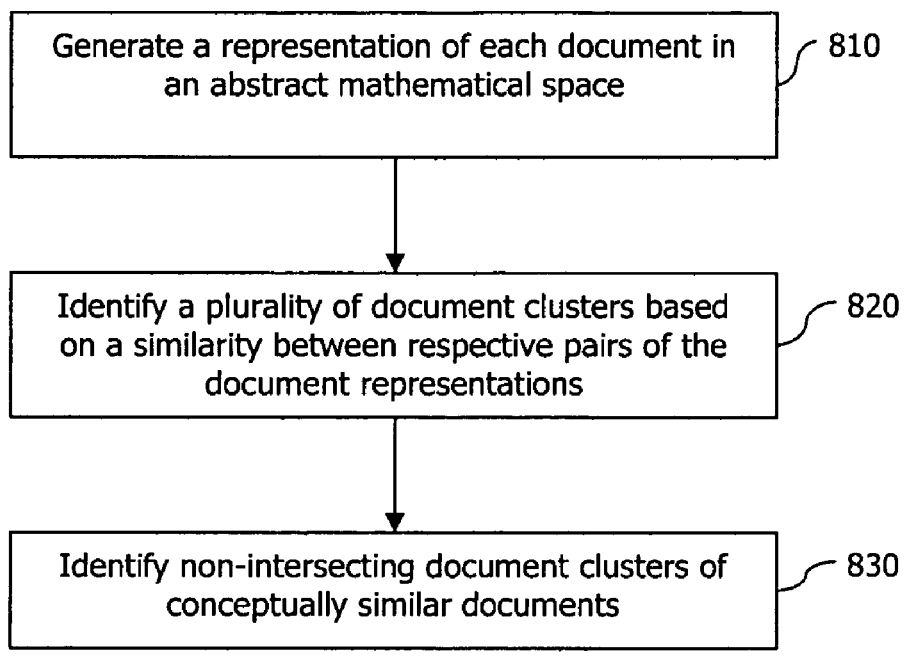

FIG. 8 is a flowchart illustrating an example method for automatically identifying non-intersecting document clusters in accordance with an embodiment of the present invention.

Figure 9:
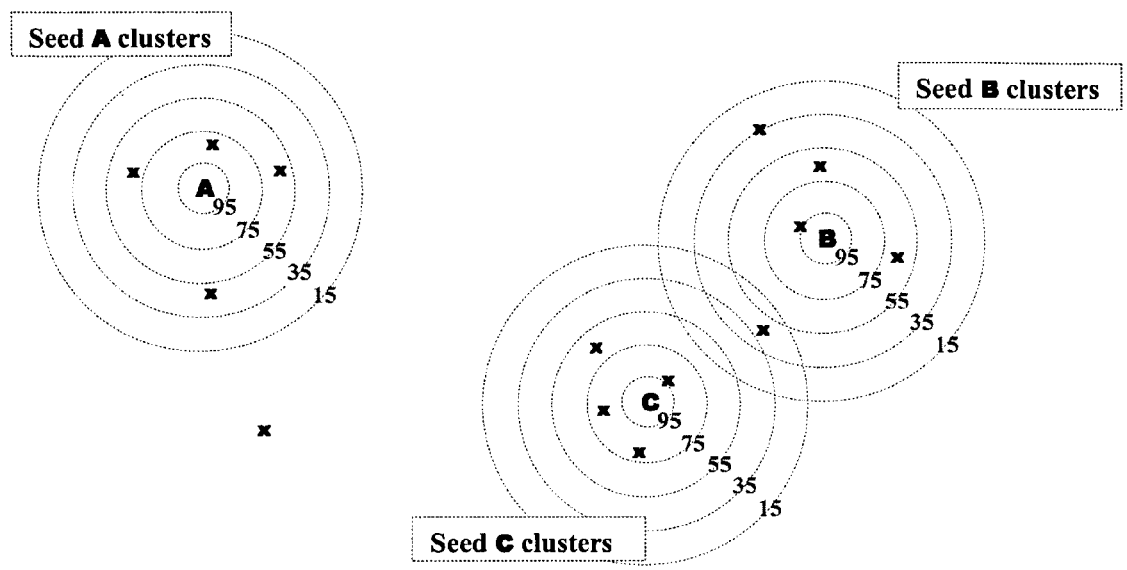

FIG. 9 depicts an example representation of clusters of documents represented in a two-dimensional abstract mathematical space.

FIGS. 10A, 10B, 10C and 10D collectively depict a method for automatically identifying non-intersecting clusters of documents in a collection of documents in accordance with an embodiment of the present invention.

FIGS. 11A, 11B, 11C, 11D, 11E and 11F present a graphical illustration of a method for creating clusters of documents based on a conceptual similarity among representations of the documents, in accordance with an embodiment of the present invention.

Figure 12:
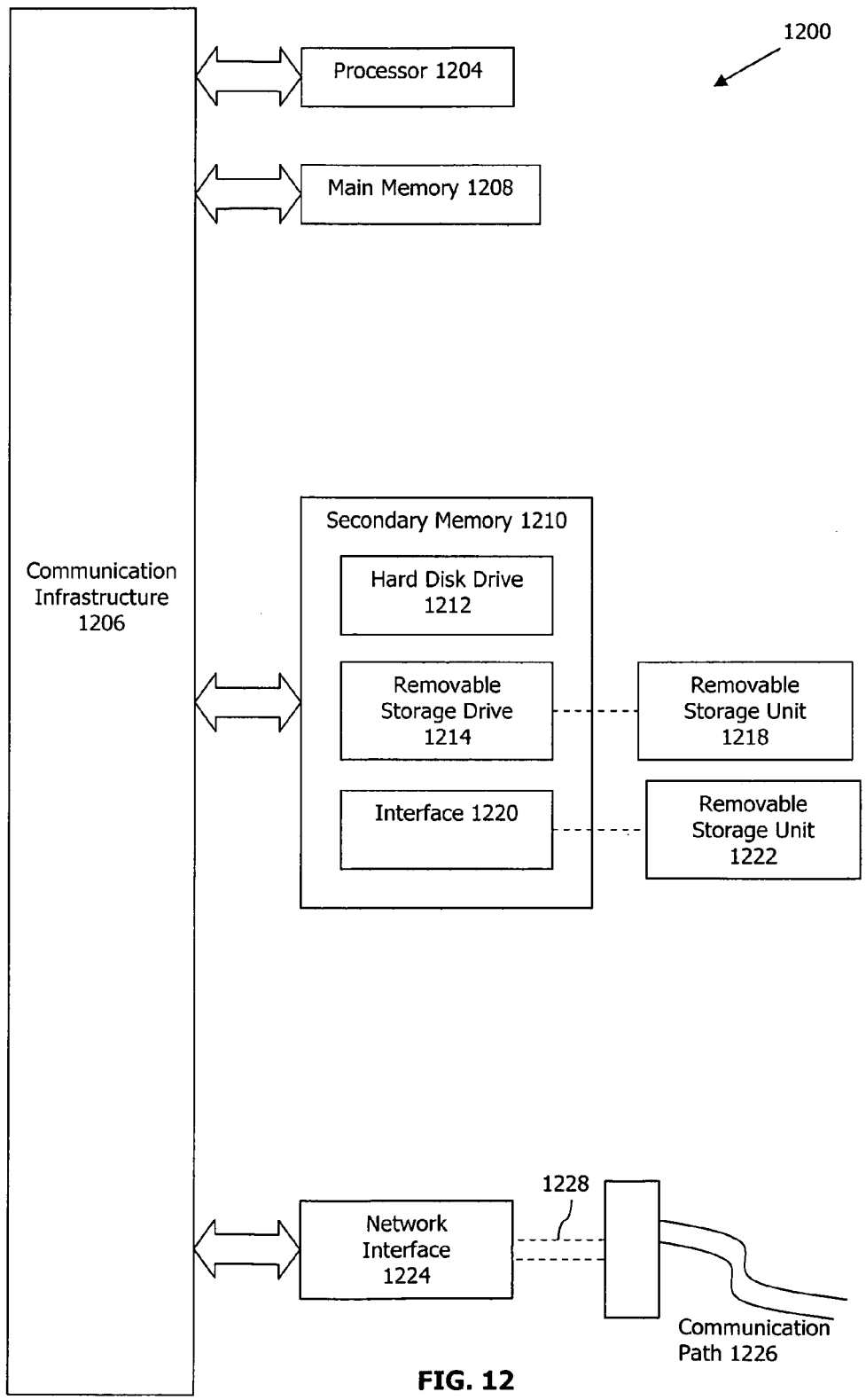

FIG. 12 is a block diagram of a computer system on which an embodiment of the present invention may be executed.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Overview
II. Identifying Seed Exemplars
  A. Overview of the Identification of Seed Exemplars
  B. Example Method for Automatic Selection of Seed Exemplars in Accordance with an Embodiment of the Present Invention
  C. Example Application of a Method in Accordance with An Embodiment of the Present Invention
III. Identifying Non-Intersecting Document Clusters
  A. Overview of the Identification of Non-Intersecting Document Clusters
  B. Example Method for Automatically Creating Specific and Non-Overlapping Clusters in Accordance with an Embodiment of the Present Invention
  C. Pseudo-Code Representation of an Algorithm in Accordance with an Embodiment of the Present Invention IV. Example Method for Automatically Clustering Documents Based on a Similarity Measure in Accordance with an Embodiment of the Present Invention V. Example Computer System Implementation VI. Example Capabilities and Applications VII. Conclusion

I. OVERVIEW

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

An embodiment of the present invention provides a method for automatically identifying clusters of conceptually-related documents by utilizing a vector representation of the documents in an abstract mathematical space. For example, the abstract mathematical space can be a Latent Semantic Indexing (LSI) indexing space, as described in U.S. Pat. No. 4,839,853 ("the '853 patent") entitled "Computer Information Retrieval Using Latent Semantic Structure" to Deerwester et al., the entirety of which is incorporated by reference herein. The LSI technique enables representation of textual data in a vector space, facilitates access to all documents and terms by contextual queries, and allows for text comparisons. As is described in more detail herein, in accordance with an embodiment of the present invention, a generator downloads a collection of documents, creates document clusters, and organizes the clusters in a hierarchy. Nodes in the hierarchy are ordered from general to specific in the depth of the hierarchy.

The hierarchy of clustered documents may be used as an input to create a taxonomy and/or to support categorization. A taxonomy is a hierarchical classification of objects. At the root of the hierarchy is a single classification of all objects. Nodes below the root provide classifications of subsets of objects.

A Clustering System in accordance with an embodiment of the present invention can employ the above-mentioned LSI information retrieval technique to efficiently index all documents required for analysis. LSI was designed to overcome the problem of mismatching words of queries with words of documents, as evident in Boolean-query type retrieval engines. In fact, LSI can be used to find relevant documents that may not even include any of the search terms of a query. LSI uses a vector space model that transforms the problem of comparing textual data into a problem of comparing algebraic vectors in a multidimensional space. Once the transformation is done, the algebraic operations are used to calculate similarities among the original documents, terms, groups of documents and their combinations.

Although the Clustering System is described in the context of an LSI-based sorting technique, it is to be appreciated that this is for illustrative purposes only, and not limitation. For example, a person skilled in the relevant art(s) will appreciate from reading the description contained herein that any technique that utilizes a vector representation of documents (and/or terms) can be employed in the Clustering System. Examples of such techniques can include, but are not limited to, the following: (i) probabilistic LSI (see, e.g., Hoffman, T., "Probabilistic Latent Semantic Indexing," *Proceedings of the 22$^{nd}$ Annual SIGIR Conference*, Berkeley, Calif., 1999, pp. 50-57); (ii) latent regression analysis (see, e.g., Marchisio, G., and Liang, J., "Experiments in Trilingual Cross-language Information Retrieval," *Proceedings*, 2001 *Symposium on Document Image Understanding Technology*, Columbia, Md., 2001, pp. 169-178); (iii) LSI using semi-discrete decomposition (see, e.g., Kolda, T., and O. Leary, D., "A Semidiscrete Matrix Decomposition for Latent Semantic Indexing Information Retrieval," *ACM Transactions on Information Systems*, Volume 16, Issue 4 (October 1998), pp. 322-346); and (iv) self-organizing maps (see, e.g., Kohonen, T., *Self-Organizing Maps*, 3$^{rd}$ Edition, Springer-Verlag, Berlin, 2001). The entirety of each of the foregoing cited references is incorporated by reference herein.

Input to the Clustering System may be in the form of a repository of documents indexed by LSI and a set of high-level parameters. Output may be in the form of a hierarchy of clusters (e.g., represented in XML) with links to the original documents. A recursive clustering process constructs nodes at consecutive levels of the hierarchy.

Figure 1:
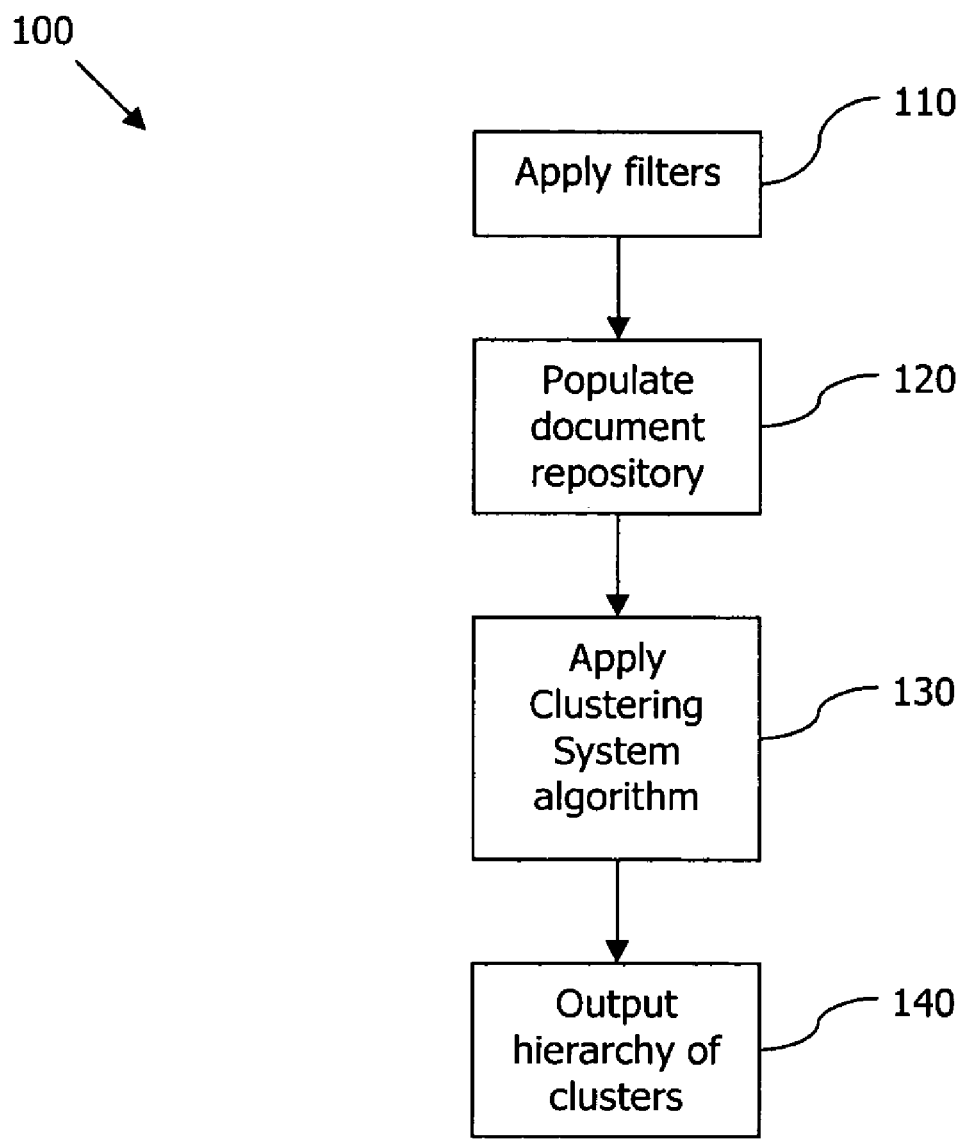
FIG. 1 depicts a flowchart of a method for automatically sorting documents in a collection of documents in accordance with an embodiment of the present invention.

FIG. 1 depicts a flowchart 100 illustrating an overview of a method of using a Clustering System in accordance with an embodiment of the present invention. Flowchart 100 begins at a step 110 in which a pipeline of filters is applied to a collection of source documents. Before indexing, the source documents are preprocessed by the pipeline of filters. The pipeline may contain filters for stop-word and stop-phrase removal. A stop-word (stop-phrase) is a word (phrase) that is ignored in a query because it is used so commonly that it does not contribute to relevancy. In addition to stop-word and stop-phrase filtering, the pipeline may contain filters for HTML/XML tagging removal, word stemming, and a pre-construction of generalized entities. A generalized entity is a semantic unit of one or more stemmed words extracted from the source documents with the exclusion of stop-words. During the preprocessing, words and word pairs (bi-words) are collected and used in indexing a document repository.

In a step 120, the document repository is populated and the LSI indexing occurs.

Figure 2:
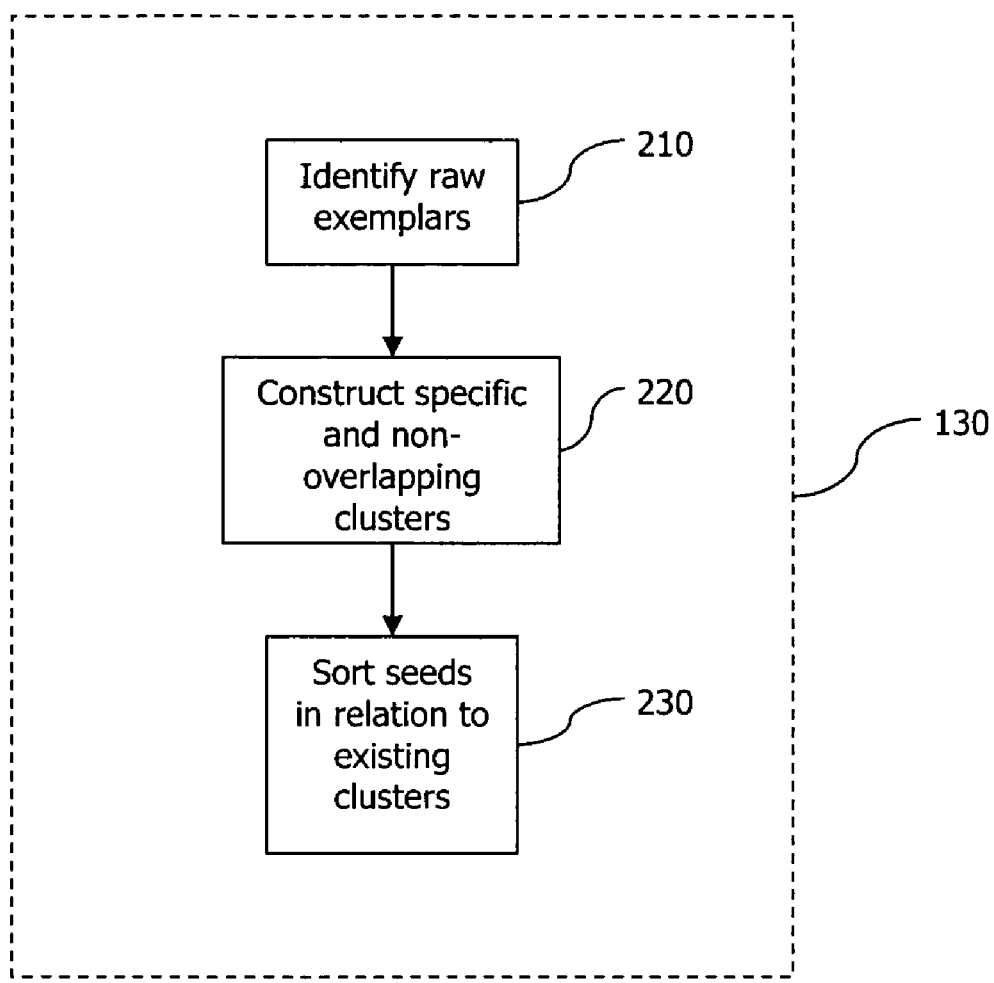
FIG. 2 depicts a flowchart of an example method for implementing a step in the flowchart of FIG. 1.

In a step 130, a clustering system algorithm is applied to the documents in the document repository. The implementation of step 130 can be realized in a number of ways. For example, FIG. 2 illustrates a manner in which step 130 is implemented.

In a step 140, the hierarchy of clusters generated by the clustering system is output. The output can be in any of a number of forms as would be apparent to a person skilled in the relevant art(s). For example, as mentioned above, the output can be in an XML format.

As mentioned above, FIG. 2 illustrates a manner in which to implement step 130. Referring to FIG. 2, in a step 210, after indexing, the Clustering System identifies representative seed exemplars. The exemplars are selected from clusters of similar documents. In fact, as selected representatives of clusters, the seed exemplars represent pivotal concepts contained in the collection. An example method for identifying the representative seed exemplars is described below and in commonly-owned U.S. patent application Ser. No. 11/262,735, entitled "Generating Representative Exemplars for Indexing, Clustering, Categorization and Taxonomy," filed Nov. 1, 2005 the entirety of which is incorporated by reference herein.

Referring back to FIG. 2, in a step 220, specific and non-overlapping clusters are constructed. A method for implementing step 220 is described in more detail below.

In a step 230, the seeds are sorted in relation to existing clusters.

It is to be appreciated that FIG. 2 is presented for illustrative purposes only, and not limitation. For example, a person skilled in the relevant art(s) will appreciate that steps 210 through 230 need not occur sequentially. In fact, in accordance with an embodiment of the present invention, and as is described in more detail below, sorting of the seeds (e.g., step 230) can occur during the process of identifying representative seed exemplars (e.g., step 210) and/or during the process of constructing specific and non-overlapping clusters (e.g., step 220).

II. IDENTIFYING SEED EXEMPLARS

As mentioned above with respect to step 210 of FIG. 2, an embodiment of the present invention can be used to automatically identify seed exemplars. First, an overview of identifying seed exemplars is given. Second, an example method for identifying seed exemplars is presented. Third, another example method for identifying seed exemplars is presented. Then, an example application is described.

A. Overview of the Identification of Seed Exemplars

Figure 3:
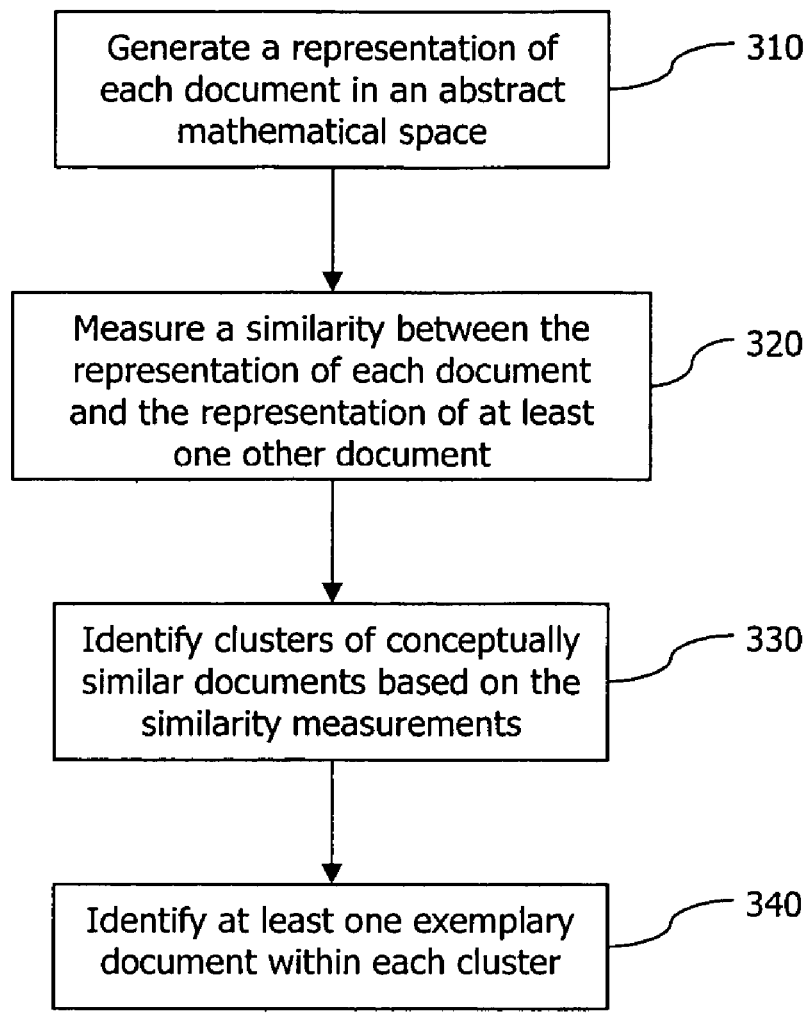
FIG. 3 is a flowchart illustrating an example method for selecting exemplar documents from a collection of documents in accordance with an embodiment of the present invention.

FIG. 3 illustrates a flowchart 300 of a general method for automatically selecting exemplary documents from a collection of documents in accordance with an embodiment of the present invention. The collection of documents can include a large number of documents, such as 100,000 documents or some other large number of documents. As was mentioned above, and as is described below, the exemplary documents can be used for generating an index, a cluster, a categorization, a taxonomy, or a hierarchy. In addition, selecting exemplary documents can reduce the number of documents needed to represent the conceptual content contained within a collection of document, which can facilitate the performance of other algorithms, such as an intelligent learning system.

Flowchart 300 begins at a step 310 in which each document in a collection of documents is represented in an abstract mathematical space. For example, each document can be represented as a vector in an LSI space as is described in detail in the '853 patent.

In a step 320, a similarity between the representation of each document and the representation of at least one other document is measured. In an embodiment in which the documents are represented in an LSI space, the similarity measurement can be a cosine measure.

FIG. 4 geometrically illustrates how the similarity between the representations can be determined. FIG. 4 illustrates a two-dimensional graph 400 including a vector representation for each of three documents, labeled $D_1$, $D_2$, and $D_3$. The vector representations are represented in FIG. 4 on two-dimensional graph 400 for illustrative purposes only, and not limitation. In fact, the actual number of dimensions used to represent a document or a pseudo-object in an LSI space can be on the order of a few hundred dimensions.

As shown in FIG. 4, an angle $\alpha_{12}$ between $D_1$ and $D_2$ is greater than an angle $\alpha_{23}$ between $D_2$ and $D_3$. Since angle $\alpha_{23}$ is smaller than angle $\alpha_{12}$, the cosine of $\alpha_{23}$ will be larger than the cosine of $\alpha_{12}$. Accordingly, in this example, the document represented by vector $D_2$ is more conceptually similar to the document represented by vector $D_3$ than it is to the document represented by vector $D_1$.

Referring back to FIG. 3, in a step 330, clusters of conceptually similar documents are identified based on the similarity measurements. For example, documents about golf can be included in a first cluster of documents and documents about space travel can be included in a second cluster of documents.

In a step 340, at least one exemplary document is identified for each cluster. In an embodiment, a single exemplary document is identified for each cluster. In an alternative embodiment, more than one exemplary document is identified for each cluster. As mentioned above, the exemplary documents represent exemplary concepts contained within the collection of documents. With respect to the example mentioned above, at least one document in the cluster of documents about golf would be identified as an exemplary document that represents the concept of golf. Similarly, at least one document in the cluster of documents about space travel would be identified as an exemplary document that represents the concept of space travel.

In an embodiment, the number of documents included in each cluster can be set based on a clustering threshold. The extent to which the exemplary documents span the conceptual content contained within the collection of documents can be adjusted by adjusting the clustering threshold. This point will be illustrated by an example.

If the clustering threshold is set to a relatively high level, such as four documents, each cluster identified in step 330 will include at least four documents. Then in step 340, at least one of the at least four documents will be identified as the exemplary document(s) that represent(s) the conceptual content of that cluster. For example, all the documents in this cluster could be about golf. In this example, all the documents in the collection of documents that are conceptually similar to golf, up to a threshold, are included in this cluster; and at least one of the documents in this cluster, the exemplary document, exemplifies the concept of golf contained in all the documents in the cluster. In other words, with respect to the entire collection of documents, the concept of golf is represented by the at least one exemplary document identified for this cluster.

If, on the other hand, there is one document in the collection of documents that is about space travel, by setting the clustering threshold to the relatively high value, the concept of space travel will not be represented by any exemplary document. That is, if the clustering threshold is set to four, no cluster including at least four documents that are each about space travel will be identified because there is only one document that is about space travel. Because a cluster is not identified for space travel, an exemplary document that represents the concept of space travel will not be identified.

However, in this example, the concept of space travel could be represented by an exemplary document if the clustering threshold was set to a relatively low value—i.e., one. By setting the clustering threshold to one, the document about space travel would be identified in a cluster that included one document. Then, the document about space travel would be identified as the exemplary document in the collection of documents that represents the concept of space travel.

To summarize, by setting the clustering threshold relatively high, major concepts contained within the collection of documents will be represented by an exemplary document. From the example above, by setting the clustering threshold to four, the concept of golf would be represented by an exemplary document, but the concept of space travel would not. Alternatively, by setting the clustering threshold relatively low, all concepts contained within the collection of documents would be represented by exemplary documents. From the example above, by setting the clustering threshold to one, each of the concepts of golf and space travel would respectively be represented by an exemplary document.

By identifying exemplary documents, the number of documents required to cover the conceptual content of the collection of documents can be reduced, without compromising a desired extent to which the conceptual content is covered. The number of documents in a collection of documents could be very large. For example, the collection of documents could include 100, 10,000, 1,000,000 or some other large number of documents. Processing and/or storing such a large number of documents can be cumbersome, inefficient, and/or impossible. Often it would be helpful to reduce this number of documents without losing the conceptual content contained within the collection of documents. Because the exemplary documents identified in step 340 above represent at least the major conceptual content of the entire collection of documents, these exemplary documents can be used as proxies for the conceptual content of the entire collection of documents. In addition, the clustering threshold can be adjusted so that the exemplary documents span the conceptual content of the collection of documents to a desired extent. For example, using embodiments described herein, 5,000 exemplary documents could be identified that collectively represent the conceptual content contained in a collection of 100,000 documents. In this way, the complexity required to represent the conceptual content contained in the 100,000 documents is reduced by 95%.

As mentioned above, the exemplary documents can be used to generate non-intersecting clusters of conceptually similar documents. The clusters identified in step 330 of flowchart 300 are not necessarily non-intersecting. For example, a first cluster of documents can include a subset of documents about golf and a second cluster of documents may also include this same subset of documents about golf. In this example, the exemplary document for the first collection of documents and the exemplary document for the second collection of documents can be used to generate non-intersecting clusters, as described below. By generating non-intersecting clusters, only one cluster would include the subset of documents about golf.

In addition, one or more exemplary documents can be merged into a single exemplary object that better represents a single concept contained in the collection of documents.

The foregoing example embodiment can also be applied to data objects other than, but including, documents. Such data objects include, but are not limited to, documents, text data, image data, video data, voice data, structured data, unstructured data, relational data, and other forms of data as would be apparent to a person skilled in the relevant art(s).

B. Example Method for Automatic Selection of Seed Exemplars in Accordance with an Embodiment of the Present Invention An example method for implementing an embodiment of the present invention is depicted in a flowchart 500, which is illustrated in FIGS. 5A, 5B and 5C. Generally speaking, the example method operates on a collection of documents, each of which is indexed and has a vector representation in the LSI space. The documents are examined and tested as candidates for cluster seeds. The processing is performed in batches to limit the use of available memory. Each document is used to create a candidate seed cluster at most one time and cached, if necessary. The seed clusters are cached because cluster creation requires matching the document vector to all document vectors in the repository and selecting those that are similar above a predetermined similarity threshold. In order to further prevent unnecessary testing, cluster construction is not performed for duplicate documents or almost identical documents.

The method of flowchart 500 will now be described in detail. As shown in FIG. 5A, the method is initiated at step 502 and immediately proceeds to step 504. At step 504, all documents in a collection of documents D are indexed in accordance with the LSI technique and are assigned a vector representation in the LSI space. The LSI technique is well-known and its application is fully explained in commonly-owned U.S. Pat. No. 4,839,853 entitled "Computer Information Retrieval Using Latent Semantic Structure" to Deerwester et al., the entirety of which is incorporated by reference herein. Alternatively, the collection of documents may be indexed using the LSI technique prior to application of the present method. In this case, step 504 may merely involve opening or otherwise accessing the stored collection of documents D. In either case, each document in the collection D is associated with a unique document identifier (ID).

The method then proceeds to step 506, in which a cache used for storing seed clusters is cleared in preparation for use in subsequent processing steps.

At step 508, a determination is made as to whether all documents in the collection D have already been processed. If all documents have been processed, the method proceeds to step 510, in which the highest quality seed clusters identified by the method are sorted and saved. Sorting may be carried out based on the size of the seed clusters or based on a score associated with each seed cluster that indicates both the size of the cluster and the similarity of the documents within the cluster. However, these examples are not intended to be limiting and other methods of sorting the seed clusters may be used. Once the seed clusters have been sorted and saved, the method ends as shown at step 512.

However, if it is determined at step 508 that there are documents remaining to be processed in document collection D, the method proceeds to step 514. At step 514, it is determined whether the cache of document IDs is empty. As noted above, the method of flowchart 500 performs processing in batches to limit the use of available memory. If the cache is empty, the batch B is populated with document IDs from the collection of documents D, as shown at step 516. However, if the cache is not empty, document IDs of those documents associated with seed clusters currently stored in the cache are added to batch B, as shown at step 518.

At step 520, it is determined whether all the documents identified in batch B have been processed. If all the documents identified in batch B have been processed, the method returns to step 508. Otherwise, the method proceeds to step 522, in which a next document d identified in batch B is selected. At step 524, it is determined whether document d has been previously processed. If document d has been processed, then any seed cluster for document d stored in the cache is removed as shown at step 526 and the method returns to step 520.

However, if document d has not been processed, then a seed cluster for document d, denoted SCd, is obtained as shown at step 528. One method for obtaining a seed cluster for a document will be described in more detail herein with reference to flowchart 600 of FIG. 6. A seed cluster may be represented as a data structure that includes the document ID for the document for which the seed cluster is obtained, the set of all documents in the cluster, and a score indicating the quality of the seed cluster. In an embodiment, the score indicates both the size of the cluster and the overall level of similarity between documents in the cluster.

After the seed cluster SCd has been obtained, the document d is marked as processed as shown at step 530.

At step 532, the size of the cluster SCd (i.e., the number of documents in the cluster) is compared to a predetermined minimum cluster size, denoted Min_Seed_Cluster. If the size of the cluster SCd is less than Min_Seed_Cluster, then the document d is essentially ignored and the method returns to step 520. By comparing the cluster size of SCd to a predetermined minimum cluster size in this manner, an embodiment of the present invention has the effect of weeding out those documents in collection D that generate very small seed clusters. In practice, it has been observed that setting Min_Seed_Cluster=4 provides satisfactory results.

If, on the other hand, SCd is of at least Min_Seed_Cluster size, then the method proceeds to step 534, in which SCd is identified as the best seed cluster. The method then proceeds to a series of steps that effectively determine whether any document in the cluster SCd provides better quality clustering than document d in the same general concept space.

In particular, at step 536, it is determined whether all documents in the cluster SCd have been processed. If all documents in cluster SCd have been processed, the currently-identified best seed cluster is added to a collection of best seed clusters as shown at step 538, after which the method returns to step 520.

If all documents in SCd have not been processed, then a next document dc in cluster SCd is selected. At step 544, it is determined whether document dc has been previously processed. If document dc has already been processed, then any seed cluster for document dc stored in the cache is removed as shown at step 542 and the method returns to step 536.

If, on the other hand, document dc has not been processed, then a seed cluster for document dc, denoted SCdc, is obtained as shown at step 546. As noted above, one method for obtaining a seed cluster for a document will be described in more detail herein with reference to flowchart 600 of FIG. 6. After the seed cluster SCdc has been obtained, the document dc is marked as processed as shown at step 548.

At step 550, the size of the cluster SCdc (i.e., the number of documents in the cluster) is compared to the predetermined minimum cluster size, denoted Min_Seed_Cluster. If the size of the cluster SCdc is less than Min_Seed_Cluster, then the document dc is essentially ignored and the method returns to step 536.

If, on the other hand, SCd is greater than or equal to Min_Seed_Cluster, then the method proceeds to step 552, in which a measure of similarity (denoted sim) is calculated between the clusters SCd and SCdc. In an embodiment, a cosine measure of similarity is used, although the invention is not so limited. Persons skilled in the relevant art(s) will readily appreciate that other similarity metrics may be used.

At step 554, the similarity measurement calculated in step 552 is compared to a predefined minimum redundancy, denoted MinRedundancy. If the similarity measurement does not exceed MinRedundancy, then it is determined that SCdc is sufficiently dissimilar from SCd that it might represent a sufficiently different concept. As such, SCdc is stored in the cache as shown at step 556 for further processing and the method returns to step 536.

The comparison of sim to MinRedundancy is essentially a test for detecting redundant seeds. This is an important test in terms of reducing the complexity of the method and thus rendering its implementation more practical. Complexity may be even further reduced if redundancy is determined based on the similarity of the seeds themselves, an implementation of which is described below. Once two seeds are deemed redundant, the seeds quality can be compared. In an embodiment of the present invention, the sum of all similarity measures between the seed document and its cluster documents is used to represent the seed quality. However, there may be other methods for determining quality of a cluster.

If the similarity measurement calculated in step 552 does exceed MinRedundancy, then the method proceeds to step 558, in which a score denoting the quality of cluster SCdc is compared to a score associated with the currently-identified best seed cluster. As noted above, the score may indicate both the size of a cluster and the overall level of similarity between documents in the cluster. If the score associated with SCdc exceeds the score associated with the best seed cluster, then SCdc becomes the best seed cluster, as indicated at step 560. In either case, after this comparison occurs, seed clusters SCd and SCdc are removed from the cache as indicated at steps 562 and 564. Processing then returns to step 536.

Note that when a document dc is discovered in cluster SCd that provides better clustering, instead of continuing to loop through the remaining documents in SCd in accordance with the logic beginning at step 536 of flowchart 500, an alternate embodiment of the present invention would instead begin to loop through the documents in the seed cluster associated with document dc (SCdc) to identify a seed document that provides better clustering. To achieve this, the processing loop beginning at step 536 would essentially need to be modified to loop through all documents in the currently-identified best seed cluster, rather than to loop through all documents in cluster SCd. Persons skilled in the relevant art(s) will readily appreciate how to achieve such an implementation based on the teachings provided herein.

In another alternative embodiment of the present invention, the logic beginning at step 536 that determines whether any document in the cluster SCd provides better quality clustering than document d in the space of equivalent concepts, or provides a quality cluster in a sufficiently dissimilar concept space, is removed. In accordance with this alternative embodiment, the seed clusters identified as best clusters in step 534 are simply added to the collection of best seed clusters and then sorted and saved when all documents in collection D have been processed. All documents in the SCd seed clusters are marked as processed—in other words, they are deemed redundant to the document d. This technique is more efficient than the method of flowchart 500, and is therefore particularly useful when dealing with very large document databases.

FIG. 6 depicts a flowchart 600 of a method for obtaining a seed cluster for a document d in accordance with an embodiment of the present invention. This method may be used to implement steps 528 and 546 of flowchart 500 as described above in reference to FIG. 5. For the purposes of describing flowchart 600, it will be assumed that a seed cluster is represented as a data structure that includes a document ID for the document for which the seed cluster is obtained, the set of all documents in the cluster, and a score indicating the quality of the seed cluster. In an embodiment, the score indicates both the size of the cluster and the overall level of similarity between documents in the cluster.

As shown in FIG. 6, the method of flowchart 600 is initiated at step 602 and immediately proceeds to step 604, in which it is determined whether a cache already includes a seed cluster for a given document d. If the cache includes the seed cluster for document d, it is returned as shown at step 610, and the method is then terminated as shown at step 622.

If the cache does not include a seed cluster for document d, then the method proceeds to step 606, in which a seed cluster for document d is initialized. For example, in an embodiment, this step may involve initializing a seed cluster data structure by emptying a set of documents associated with the seed cluster and moving zero to a score indicating the quality of the seed cluster.

The method then proceeds to step 608 in which it is determined whether all documents in a document repository have been processed. If all documents have been processed, it is assumed that the building of the seed cluster for document d is complete. Accordingly, the method proceeds to step 610 in which the seed cluster for document d is returned, and the method is then terminated as shown at step 622.

If, however, all documents in the repository have not been processed, then the method proceeds to step 612, in which a measure of similarity (denoted s) is calculated between document d and a next document i in the repository. In an embodiment, s is calculated by applying a cosine similarity measure to a vector representation of the documents, such as an LSI representation of the documents, although the invention is not so limited.

At step 614, it is determined whether s is greater than or equal to a predefined minimum similarity measurement, denoted minSIM, and less than or equal to a predefined maximum similarity measurement, denoted maxSIM, or if the document d is in fact equal to the document i. The comparison to minSIM is intended to filter out documents that are conceptually dissimilar from document d from the seed cluster. In contrast, the comparison to maxSIM is intended to filter out documents that are duplicates of, or almost identical to, document d from the seed cluster, thereby avoiding unnecessary testing of such documents as candidate seeds, i.e., steps starting from step 546. In practice, it has been observed that setting minSIM to a value in the range of 0.35 to 0.40 and setting maxSIM to 0.99 produces satisfactory results, although the invention is not so limited. Furthermore, testing for the condition of d=i is intended to ensure that document d is included within its own seed cluster.

If the conditions of step 614 are not met, then document i is not included in the seed cluster for document d and processing returns to step 608. If, on the other hand, the conditions of step 614 are met, then document i is added to the set of documents associated with the seed cluster for document d as shown at step 616 and a score is incremented that represents the quality of the seed cluster for document d as shown at step 620. In an embodiment, the score is incremented by the cosine measurement of similarity between document d and i, although the invention is not so limited. After step 620, the method returns to step 608.

It is noted that the above-described methods depend on a representation of documents and a similarity measure to compare documents. Therefore, any system that uses a representation space with a similarity measure could be used to find exemplary seeds using the algorithm.

C. Example Application of a Method in Accordance with an Embodiment of the Present Invention FIGS. 7A, 7B, 7C, 7D and 7E present tables that graphically demonstrate, in chronological order, the application of a method in accordance with an embodiment of the present invention to a collection of documents d1-d10. Note that these tables are provided for illustrative purposes only and are not intended to limit the present invention. In FIGS. 7A-7E, an unprocessed document is indicated by a white cell, a document being currently processed is indicated by a light gray cell, while a document that has already been processed is indicated by a dark gray cell. Documents that are identified as being part of a valid seed cluster are encompassed by a double-lined border.

FIG. 7A shows the creation of a seed cluster for document d1. As shown in that figure, document d1 is currently being processed and a value denoting the measured similarity between document d1 and each of documents d1-d10 has been calculated (not surprisingly, d1 has 100% similarity with itself). In accordance with this example, a valid seed cluster is identified if there are four or more documents that provide a similarity measurement in excess of 0.35 (or 35%). In FIG. 7A, it can be seen that there are four documents that have a similarity to document d1 that exceeds 35%—namely, documents d1, d3, d4 and d5. Thus, these documents are identified as forming a valid seed cluster.

In FIG. 7B, the seed cluster for document d1 remains marked and document d2 is now currently processed. Documents d1, d3, d4 and d5 are now shown as processed, since each of these documents were identified as part of the seed cluster for document d1. In accordance with this example method, since documents d1, d3, d4 and d5 have already been processed, they will not be processed to identify new seed clusters. Note that in an alternate embodiment described above in reference to FIGS. 5A-5C, additional processing of documents d3, d4 and d5 may be performed to see if any of these documents provide for better clustering than d1.

As further shown in FIG. 7B, a value denoting the measured similarity between document d2 and each of documents d1-d10 is calculated. However, only the comparison of document d2 to itself provides a similarity measure greater than 35%. As a result, in accordance with this method, no valid seed cluster is identified for document d2.

In FIG. 7C, documents d1-d5 are now shown as processed and document d6 is currently being processed. The comparison of document d6 to documents d1-d10 yields four documents having a similarity measure that exceeds 35%—namely, documents d6, d7, d9 and d10. Thus, in accordance with this method, these documents are identified as a second valid seed cluster. As shown in FIG. 7D, based on the identification of a seed cluster for document d6, each of documents d6, d7, d9 and d10 are now marked as processed and the only remaining unprocessed document, d8, is processed.

The comparison of d8 to documents d1-d10 yields four documents having a similarity measure to d8 that exceeds 35%. As a result, documents d3, d5, d7 and d8 are identified as a third valid seed cluster as shown in FIG. 7D. As shown in FIG. 7E, all documents d1-d10 have now been processed and three valid seed clusters around representative documents d1, d6 and d8 have been identified.

The method illustrated by FIGS. 7A-7E may significantly reduce a search space, since some unnecessary testing is skipped. In other words, the method utilizes heuristics based on similarity between documents to avoid some of the document-to-document comparisons. Specifically, in the example illustrated by these figures, out of ten documents, only four are actually compared to all the other documents. Other heuristics may be used, and some are set forth above in reference to the methods of FIGS. 5A-5C and FIG. 6.

III. Identifying Non-Intersecting Document Clusters

As mentioned above, the representative seed exemplars identified in accordance with step 210 of FIG. 2 do not necessarily correspond with non-intersecting document clusters. However, as mentioned with respect to step 220 of FIG. 2, an embodiment of the present invention identifies non-intersecting document clusters. First, an overview of a manner in which to identify non-intersecting document clusters is presented. Second, an example method of identifying non-intersecting document clusters is described. Then, a pseudo-code for identifying non-intersecting document clusters is given.

A. Overview of the Identification of Non-Intersecting Document Clusters

Given the seed exemplars generated for a repository (e.g., the method described with reference to FIGS. 5A, 5B, 5C and 6), the Clustering System performs clustering of all or a subset of documents from the repository depending on an application mode. The clustering can be performed in two modes: (1) for the whole repository, (2) for a collection of documents selected from the repository by executing a query. In both cases the exemplary documents (seeds) are utilized for clustering, and the main procedure involves constructing both non-intersecting and specific clusters.

FIG. 8 depicts a flowchart 800 illustrating a method for automatically identifying clusters of conceptually-related documents in a collection of documents. Flowchart 800 begins at a step 810 in which a document-representation of each document is generated in an abstract mathematical space. For example, the document-representation can be generated in an LSI space, as described above and in the '853 patent.

In a step 820, a plurality of document clusters is identified based on a conceptual similarity between respective pairs of the document-representations. Each document cluster is associated with an exemplary document and a plurality of other documents. For example, the exemplary document can be identified as described above with reference to FIGS. 3, 4, 5, 6 and/or 7.

In a step 830, a non-intersecting document cluster is identified from among the plurality of document clusters. The non-intersecting document cluster is identified based on two factors: (i) a conceptual similarity between the document-representation of the exemplary document and the document-representation of each document in the non-intersecting cluster; and (ii) a conceptual dissimilarity between a cluster-representation of the non-intersecting document cluster and a cluster-representation of each other document cluster.

The specific and non-overlapping clusters cover a part of the documents in the collection. There are several options one may execute afterwards.

(1) Similar clusters may be merged together according to a user specified generality parameter (e.g. merging clusters if they are similar above a certain threshold).

(2) The un-clustered documents may be added to existing clusters by measuring closeness to all clusters and adding a document to those which are similar above a certain threshold (this may create overlapping clusters); or adding a document to the most similar cluster above a certain threshold, which would preserve disjoint clusters.

(3) The documents in the clusters may be recursively clustered and thus the hierarchy of document collections created.

The clustering is performed for discrete levels of similarity. To this end, the range between similarity 0 and similarity 100 is divided into bins of units, such as 5 units. Consequently, the algorithm uses a data structure to describe seed clusters for various levels of similarity. In particular, it collects document IDs clustered for each level of similarity. FIG. 9 illustrates a two-dimensional representation of an abstract mathematical space with exemplary clusters of documents. Each non-seed document is depicted as an "x". The cluster is built around its seed (the document in the center) using documents in the close neighborhood. In fact, for one seed document many clusters are considered depending on the similarity between the seed document and those in the neighborhood. For example, seed A produces a cluster of 4 documents with a similarity greater than 55, and a cluster of 5 documents with a similarity greater than 35. Different clusters related to the same seed can be denoted by indicating the similarity level, e.g. cluster A55 would indicate the cluster including seed A and the 4 documents with a similarity greater than 55 and A35 would indicate the cluster including seed A and the 5 documents with a similarity greater than 35.

Besides document similarities inside a cluster, a method in accordance with an embodiment of the present invention explores similarities or rather dissimilarities among clusters. This is also done under changing similarity levels. For example, clusters B55 and C55 are non-overlapping, whereas B35 and C15 do overlap, i.e. share a common document.

During processing, the algorithm distinguishes three types of seeds: useful, useless, and retry seeds. The "useful seeds" are cached for use with less constrained conditions. The "useless seeds" are never used again and therefore, not cached. The "retry seeds" are those useful seeds that are reused at the same cluster similarity level (sim) but with a less restricted dissimilarity level (disim) to other clusters.

In short, the algorithm identifies seed exemplary documents in the collection being clustered. Seeds are processed and clusters are constructed in a special order determined by cluster internal similarity levels and a cluster's dissimilarity to clusters already constructed.

B. Example Method for Automatically Creating Specific and Non-Overlapping Clusters in Accordance with an Embodiment of the Present Invention FIGS. 10A, 10B, 10C and 10D collectively show a method 1000 for creating distinct and non-overlapping clusters of documents in accordance with an embodiment of the present invention. Method 1000 begins at a step 1001 and immediately proceeds to a step 1002 in which all documents (d) in a collection of documents (D) are opened. Then, method 1000 proceeds to a step 1003 in which a useless seeds cache, a useful seeds cache and a clustered documents cache are all cleared.

In a step 1004, a maximum similarity measure is set. For example, the maximum similarity measure can be a cosine measure having a value of 0.95. However, it will be apparent to a person skilled in the relevant art(s) that any similarity measure can be used. For example, the similarity measure can be, but is not limited to, an inner product, a dot product, an Euclidian measure or some other measure as known in the relevant art(s). Step 1004 represents a beginning of a similarity FOR-loop that cycles through various similarity levels, as will become apparent with reference to FIG. 10A and from the description contained herein.

In a step 1005, an initial dissimilarity level is set. Step 1005 represents a beginning of a dissimilarity FOR-loop that cycles through various dissimilarity levels, as will become apparent with reference to FIG. 10A and from the description contained herein In a step 1006, a document, d, in the collection of documents, D, is selected. Step 1006 represents a beginning of a document FOR-loop that cycles through all the documents d in a collection of documents D, as will become apparent with reference to FIG. 10A and from the description contained herein.

In a decision step 1007, it is determined if d is a representative seed exemplar. If d is not a representative seed exemplar, then document d does not represent a good candidate document for clustering, so method 1000 proceeds to a step 1040—i.e., it proceeds to a decision step in the document FOR-loop, which will be described below.

If, however, in step 1007, it is determined that d is a representative seed exemplar, then method 1000 proceeds to step 1008 in which it is determined if d is in the useless seeds cache or if d is in the clustered documents cache. If d is in either of these caches, then d does not represent a "good" seed for creating a cluster. Hence, a new document must be selected from the collection of documents, so method 1000 proceeds to step 1040.

Figure 10A:
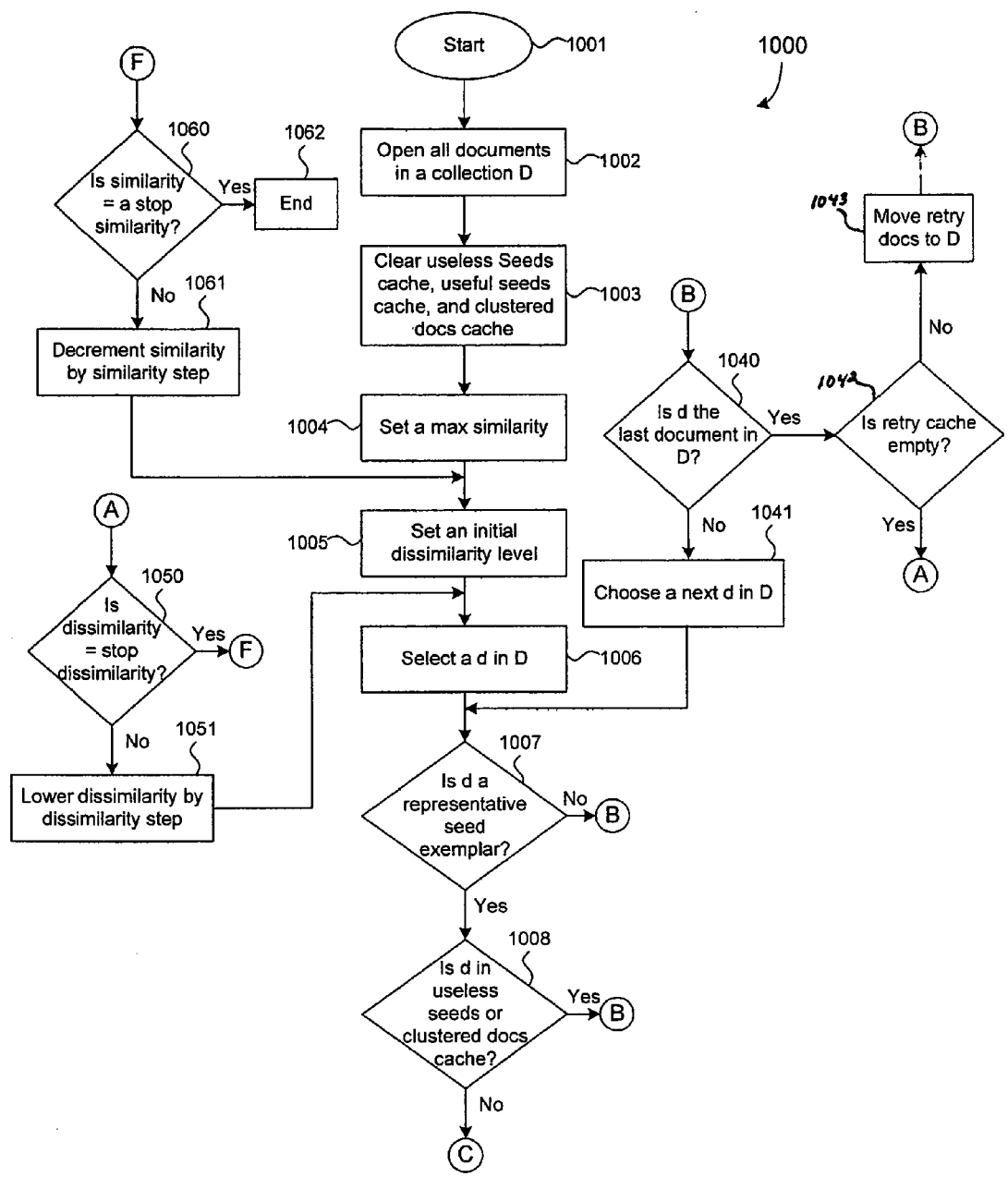
Figure 10B:
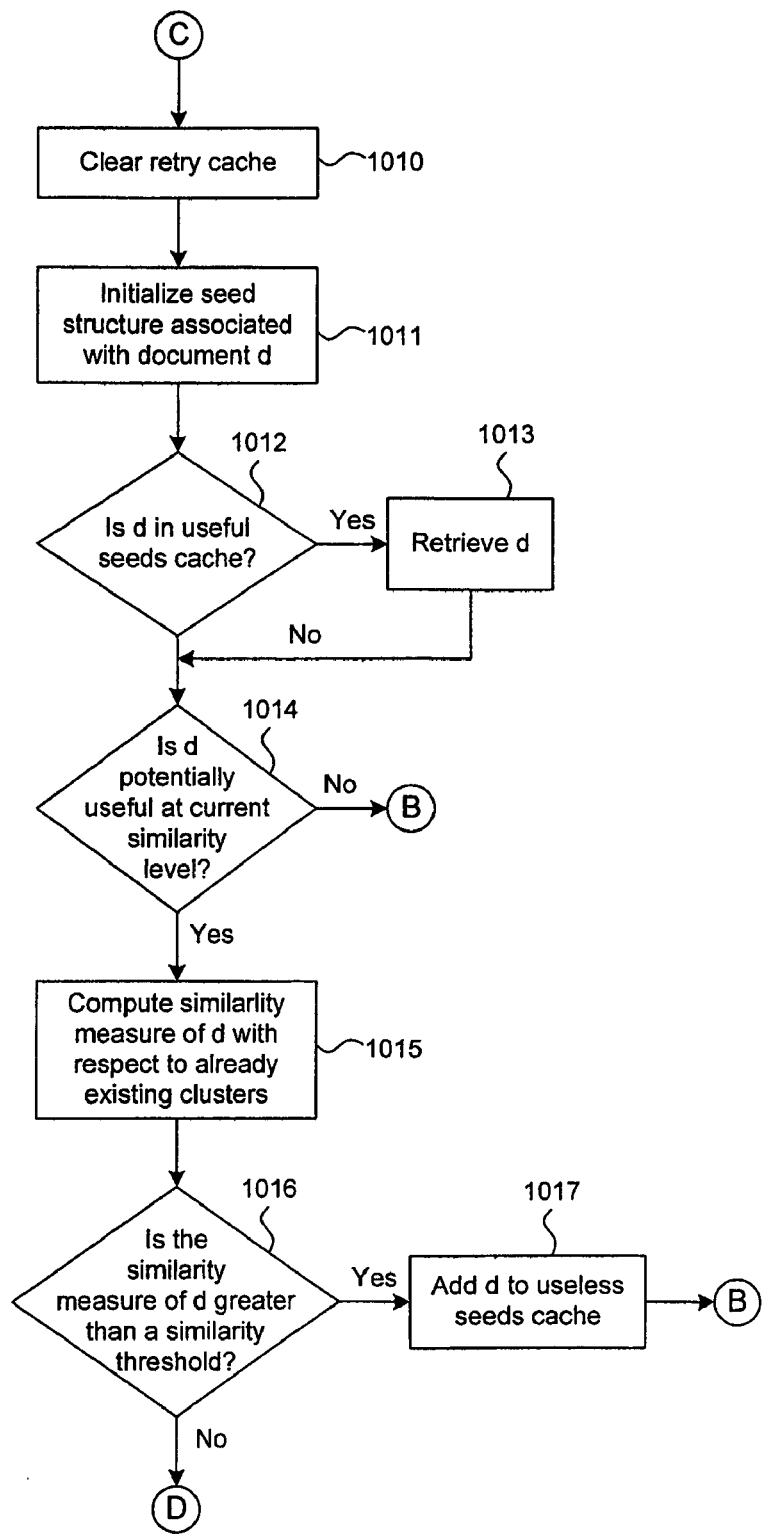
Figure 10C:
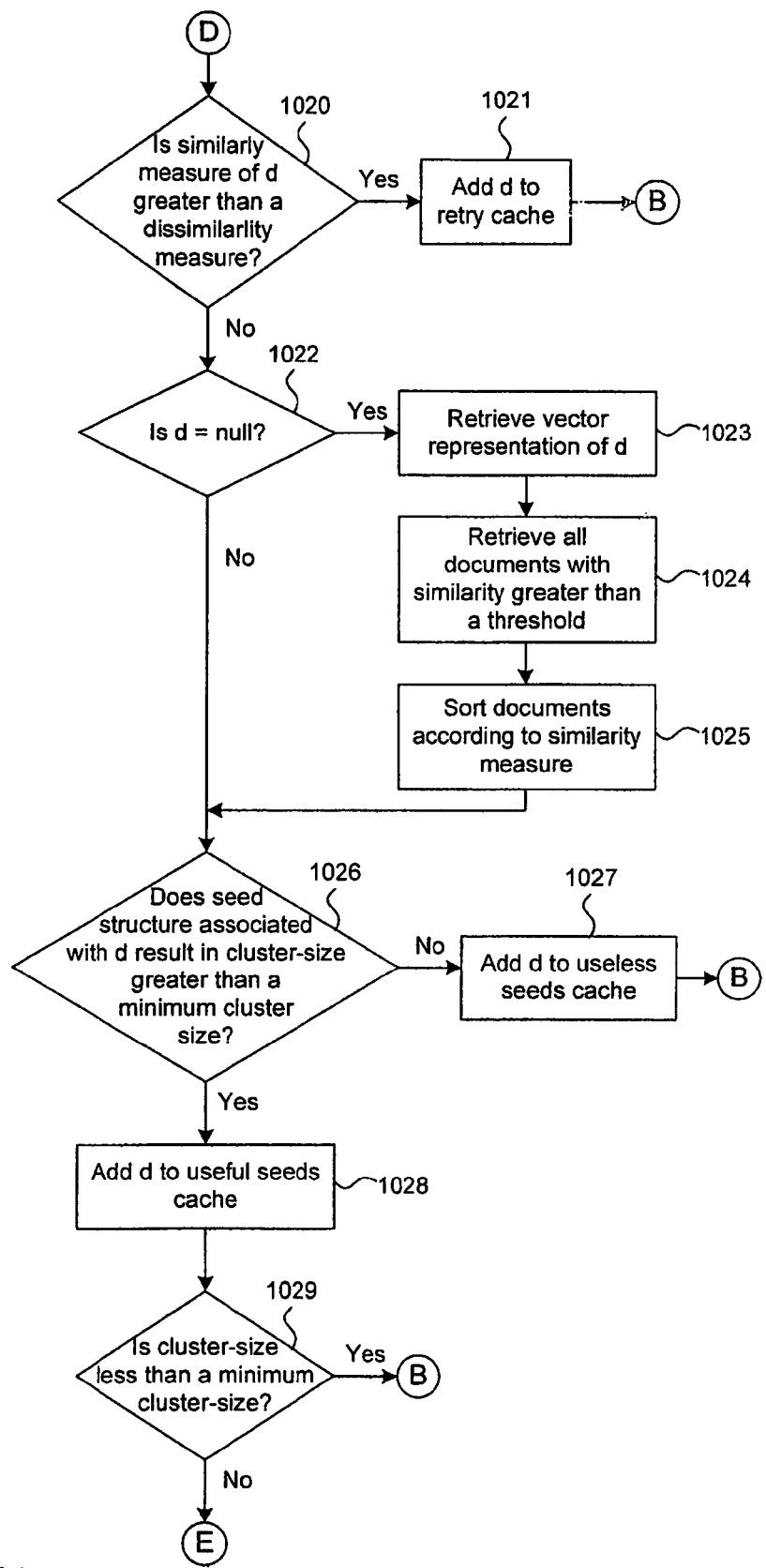
Figure 10D:
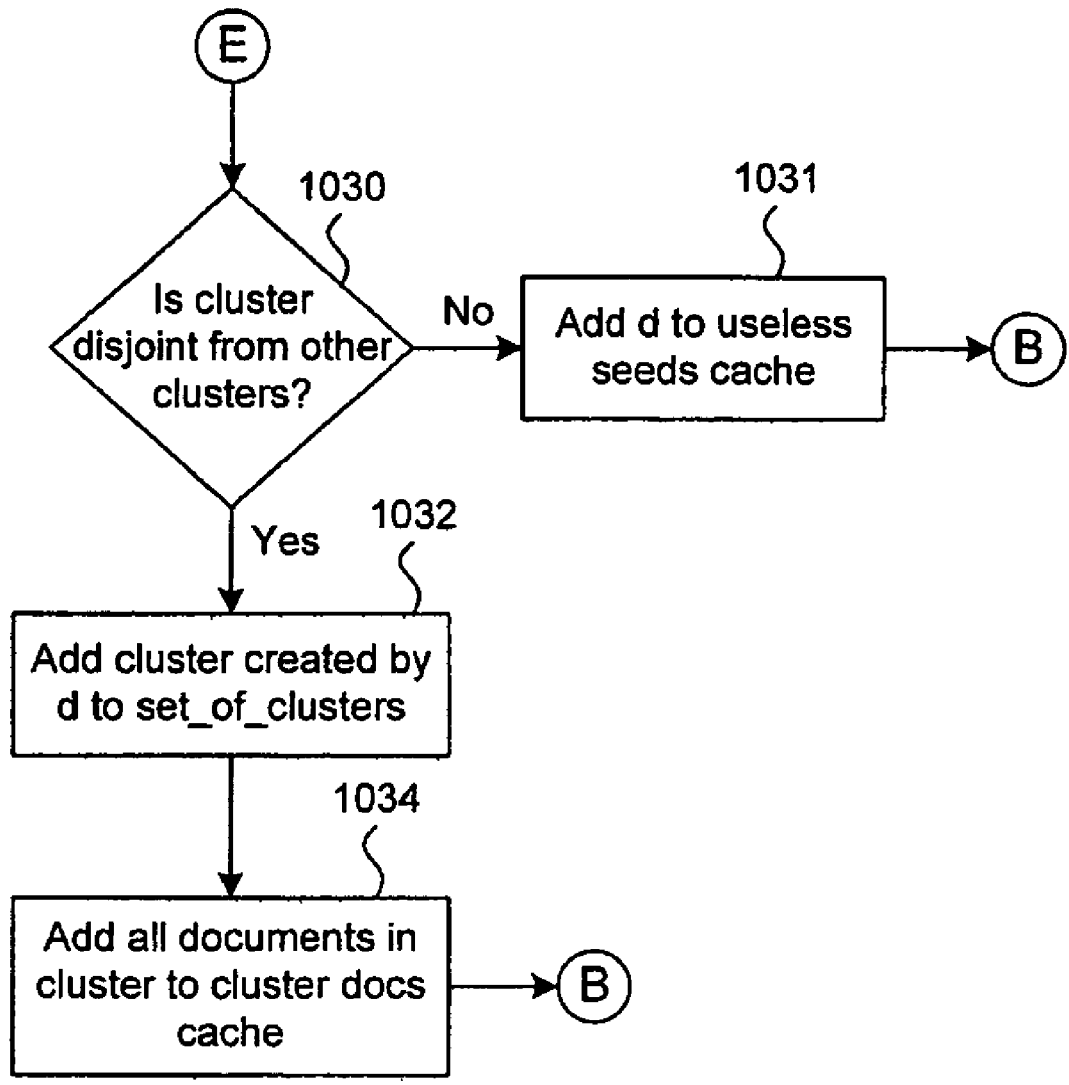

However, if in step 1008, it is determined that d is not in the useless seeds cache or the clustered documents cache, method 1000 proceeds to a step 1010, which is shown at the top of FIG. 10B. In step 1010, a retry cache is cleared.

In a step 1011, a seed structure associated with document d is initialized. In a step 1012, it is determined if d is in the useful seeds cache. If document d is in the useful seeds cache, then it can be retrieved—i.e., method 1000 proceeds to a step 1013. By retrieving d from the useful seeds cache, a seed structure associated with d will not have to be constructed, which makes method 1000 efficient. After retrieving d, method 1000 proceeds to a step 1014. If, in step 1012, it is determined that d is not in the useful seeds cache, method 1000 proceeds to step 1014, but the seed structure associated with document d will have to be constructed as is described below.

In step 1014, it is determined if d is potentially useful at the current level of similarity. For example, if the current similarity level is a cosine measure set to 0.65, a potentially useful seed at this similarity level will be such that a minimum number of other documents are within 0.65 or greater of the potentially useful seed. The minimum number of other documents is an empirically determined number, and for many instances four or five documents is sufficient. If, in step 1014, it is determined that d is not a potentially useful document at the currently similarity level, method 1000 proceeds to step 1040 and cycles through the document FOR-loop.

However, if, in step 1014, it is determined that d is potentially useful at the current similarity level, then method 1000 proceeds to a step 1015 in which the similarity measure of d with respect to all existing clusters is computed. Then, in a step 1016, it is determined if the similarity measure of d is greater than a similarity threshold. That is, if d is too close to existing clusters it will not lead to a non-overlapping cluster, and therefore it is useless. So, if d is too close to existing clusters, in a step 1017, d is added to the useless seeds cache. Then, method 1000 proceeds to step 1040 and cycles through the document FOR-loop.

However, if, in step 1016, it is determined that the similarity measure of d is not greater than a similarity threshold (i.e., d is not too close to existing clusters), method 1000 proceeds to D. Referring now to the top of FIG. 10C, from D method 1000 immediately proceeds to a step 1020 in which it is determined if a similarity measure of d is greater than a dissimilarity measure. That is, decision step 1020 determines if d is a farthest distance from other clusters or if there are other documents that would potentially lead to "better" clusters. If the similarity of d is greater than the dissimilarity measure, d may be useful; but, there may be documents that are more useful, so in a step 1021 d is added to the retry cache. From step 1021, method 1000 proceeds to step 1040 and cycles through the document FOR-loop.

However, if in step 1020 it is determined that the similarity measure of d is not greater than a dissimilarity measure, method 1000 proceeds to a step 1022 in which it is determined if d is a null. That is, step 1022 determines if the seed structure associated with d already exists. If d is a null, then the seed structure associated with d does not exist and it must be created. So, in a step 1023, a vector representation of d is retrieved. In a step 1024, all the documents with a similarity measured greater than a threshold with respect to document d are retrieved. For example, the threshold can be a cosine similarity of 0.35. In a step 1025, all the documents that were retrieved in the step 1024 are sorted according to the similarity measure, then the method proceeds to a step 1026. If, in step 1022, it is determined that d is not a null, then the seed structure associated with d already exists and steps 1023-1025 are by-passed, and method 1000 proceeds directly to step 1026.

In step 1026, it is determined if the seed structure associated with d is in a cluster size greater than a minimum cluster size. That is, it is determined if d will ever lead to a cluster with at least the minimum number of documents, regardless of the similarity level. If d will never lead to a minimum cluster size, d is added to the useless seeds cache in step 1027. Then, method 1000 proceeds to step 1040 and cycles through the document FOR-loop.

However, if, in step 1026, it is determined that the seed structure associated with d results in a cluster size greater than a minimum cluster size, then method 1000 proceeds to a step 1028 in which d is added to the useful seeds cache. In a step 1029, it is determined if the cluster size is less than a minimum cluster size. That is, step 1029 determines if d leads to a good cluster at the current similarity level. If it does not lead to a good cluster at the current similarity level, method 1000 proceeds to step 1040 and cycles through the document FOR-loop.

However, if in step 1029, it is determined that the cluster size is greater or equal to a minimum cluster size (i.e., document d leads to a good cluster at the current similarity level), method 1000 proceeds to a step 1030. Referring now to the top of FIG. 10D, in step 1030, it is determined if the cluster is disjoined from other clusters. If it is not, then document d does not lead to a disjoint cluster so d is added the useless seeds cache in a step 1031. Then, method 1000 proceeds to B and cycles through the document FOR-loop.

However, if, in the step 1030, it is determined that the cluster is disjoined from other clusters, then method 1000 proceeds to a step 1032 in which the cluster created by d is added to a set of clusters. From step 1032, method 1000 proceeds to a step 1034 in which all documents in the cluster of step 1032 are added to the clustered documents cache. In this way, documents that have been included in a cluster will not be processed again, making method 1000 efficient. From step 1034, method 1000 immediately proceeds to step 1040 and cycles through the document FOR-loop.

As mentioned above, step 1040 represents a decision step in the document FOR-loop. In step 1040, it is determined whether d is the last document in the collection D. If d is the last document in D, then method 1000 proceeds to a step 1042. However, if d is not the last document in D, method 1000 proceeds to a step 1041 in which a next document d in the collection of documents D is chosen, and method 1000 continues to cycle through the document FOR-loop.

In step 1042, it is determined if the retry cache is empty. If the retry cache is empty, then there are no more documents to cycle through; that is, the document FOR-loop is finished. Hence, method 1000 proceeds to a step 1050—i.e., it proceeds to a decision step in the dissimilarity FOR-loop. If the retry cache is not empty, method 1000 proceeds to a step 1043 in which the retry documents are moved back into the collection of documents D. Then, method 1000 proceeds back to step 1040, which was discussed above.

As mentioned above, step 1050 represents a decision step in the dissimilarity FOR-loop. In step 1050, it is determined whether the dissimilarity measure is equal to a stop dissimilarity measure. The stop dissimilarity is set to ensure that the seeds lead to disjoint clusters. That is, the dissimilarity measure indicates a distance between a given seed d and potential other seeds in the collection of documents D. The greater the distance the smaller the similarity; and hence the greater the likelihood that the given seed will lead to a disjoint cluster. By way of example, in an embodiment in which a cosine measure is used as the similarity measure, the initial dissimilarity can be set at 0.05 and the stop dissimilarity can be set at 0.45. Since the stop dissimilarity, in this example, is set at 0.45, the closest two potential seeds can be to each other is 0.45. If in step 1050, it is determined that the dissimilarity is not equal to the stop dissimilarity, method 1000 proceeds to a step 1051 in which the dissimilarity is lowered (decremented) by a dissimilarity step. Then, method 1000 cycles back through the document FOR-loop starting at step 1006.

However, if in step 1050, the dissimilarity measure is equal to a stop dissimilarity measure, then the dissimilarity FOR-loop is completed and method 1000 proceeds to a step 1060—i.e., it proceeds to a decision step in the similarity FOR-loop.

In step 1060, it is determined whether a similarity is equal to a stop similarity. Recall, that the dissimilarity measure is used to indicate how far a given seed is from other potential seeds. In contrast, the similarity is used indicate how close documents are to a given seed—i.e., how tight is the cluster of documents associated with the given seed. If, in step 1060, it is determined that the similarity is equal to the stop similarity, then the similarity FOR-loop is completed and method 1000 ends. However, if in step 1060, the similarity is not equal to a stop similarity, method 1000 proceeds to a step 1061 in which the similarity is decremented by a similarity step. Then, method 1000 cycles back through the dissimilarity FOR-loop starting at step 1005.

It is to be appreciated that the method described above with reference to FIGS. 10A, 10B, 10C and 10D can be implemented in a number of programming languages. It will be apparent to a person skilled in the relevant art(s) how to perform such implementation upon reading the description herein.

C. Pseudo-Code Representation of an Algorithm in Accordance with an Embodiment of the Present Invention.

The following is a pseudo-code representation of an algorithm for generating specific and non-intersecting clusters in accordance with an embodiment of the present invention.

```
Input:
    A collection of documents indexed by LSI (sdocids)
    Seed representative exemplars (rawSeeds)
Output:
    Set of both specific and non-intersecting clusters (children nodes)
1.   open collection (DOCS) of documents to be clustered
2.   D ← DOCS
3.   uselessSeeds ← empty        // Docs not creating useful clusters
4.   usefulSeeds ← empty         // Cached seed descriptions
5.   clusteredDocs ← empty       // Processed documents
6.   initSIM ← 95
7.   stopSIM ← 55
8.   stepSIM ← 5
9.   for similarity levels (sim) from initSIM to stopSIM decrement by stepSIM
10.      initDISIM ← 5
11.      stopDISIM ← 45
12.      stepDISIM ← 5
13.      for dissimilarity levels (disim) from initDISIM to stopDISIM increment by stepDISIM
14.         for all documents (d) in D: d in rawSeeds and not in (uselessSeeds or clusteredDocs) do
15.            retry ← empty
16.            sd ← null
17.            if (d in usefulSeeds) then
18.               sd ← (Seed) usefulSeeds.get(d)
19.               // Is this seed potentially useful at this similarity level
20.               if sd.level < sim then continue
21.            end if
22.
23.            // Find max similarity (dissimilarity) of d to already created clusters
24.            d_clusters ← Similarity(clusters, d)
25.            // Could d be useful for any acceptable dissimilarity level?
26.            if (d_clusters > stopSIM)
27.               uselessSeeds.add(d) // Never useful
28.               continue
29.            end if
30.            if (d_clusters > disim)
31.               retry.add(d) // May be useful at less restricted dissimilarity
32.               continue
33.            end if
34.
35.            // Document d creates cluster that is sufficiently distant from others
36.            if (sd = null) then
37.               vd ← vector representation of document d
38.               rs ← select docid,cosine(vd) from DOCS where cos( )>0.35
39.               sd ← new Seed(rs, MIN_CLUSTER)
40.            end if
41.
42.            // Evaluate the quality of this seed at the current requirements
43.            // 1. Will size of the cluster ever exceed the minimum?
44.            if (sd.getCount(stopSIM) < MIN_CLUSTER) then
45.               uselessSeeds.add(d)
46.               continue
47.            end if
48.            usefulSeeds.put(d, sd) // Cache the useful seed
49.
50.            // 2. Is the size sufficient for the current similarity level ?
51.            if (sd.getCount(sim) < MIN_CLUSTER) then continue
52.
53.            // 3. Is this cluster disjoint from other clusters? Any docs shared?
54.            if ( overlaps(d, clusters) ) then
55.               uselessSeeds.add(d)
56.               continue
57.            end if
58.
59.            // Document d creates sufficiently large cluster for this similarity (sim) and the cluster does not overlap any previously created clusters
60.            // Add cluster created by document d to the set of clusters, and
61.            // assume all documents in the cluster as processed (clusteredDocs)
62.            clusters.add(sd.cluster)
63.            clusteredDocs.addAll(sd.cluster)
64.         end for // all documents in D
65.         D ← retry
66.      end for // dissimilarity levels to other clusters
67.   end for // similarity of documents in the constructed cluster
```

IV. EXAMPLE METHOD FOR CLUSTERING DOCUMENTS BASED ON A SIMILARITY MEASURE IN ACCORDANCE WITH AN EMBODIMENT OF THE PRESENT INVENTION

Applying the clustering algorithms described above may not result in document clusters with sufficient granularity for a particular application. For example, applying the clustering algorithms to a collection of 100,000 documents may result in clusters with at least 5,000 documents. It may be too time consuming for a single individual to read all 5,000 documents in a given cluster, and therefore it may be desirable to partition this given cluster into sub-clusters. However, if there is a high level of similarity among the 5,000 documents in this cluster, the above-described algorithms may not be able to produce sub-clusters of this 5,000 document cluster.

This section describes an algorithm, called SimSort, that may be applied as a second order clustering algorithm to produce finer grained clusters compared to the clustering capabilities of the methods described above. Additionally or alternatively, the SimSort algorithm described in this section may be applied as a standalone feature, as described in more detail below.

A. Second Order Clustering Embodiment

The SimSort algorithm assumes that every document has a vector representation and that there exists a measure for determining similarity between document vectors. For example, each document can be represented as a vector in an abstract mathematical vector space (such as an LSI space), and the similarity can be a cosine similarity between the vectors in the abstract mathematical vector space. SimSort constructs a collection of cluster nodes. Each node object contains document identifiers of similar documents. In one pass through all the documents, every document is labeled with one of two mappings—a "cluster" map or an "assigned" map. The "cluster" map contains the identifiers of documents for which a most similar document was found and the similarity exceeds a threshold, such as a cosine similarity threshold. The "assigned" map contains the identifiers of documents which were found most similar to the "cluster" documents or to the "assigned" documents.

A predetermined threshold is used to determine which documents may start clusters. If the most similar document (denoted $doc_j$) to a given document (denoted $doc_i$) has not been tested yet (i<j), and if the similarity between the two documents is above the threshold, then a new cluster is started. If, on the other hand, the most similar document ($doc_j$) to a given document ($doc_i$) has already been tested (i>j), and if the similarity between the two documents is below the predetermined threshold, then a new cluster is not started and $doc_i$ is added to a node called "other," which collects documents not forming any clusters.

Provided below is a pseudo-code representation of the SimSort algorithm for automatically clustering documents based on a similarity measure in accordance with an embodiment of the present invention. The operation of this pseudo-code will be described with reference to FIGS. 11A-11F.

```
1.  open collection (DOCS) of documents to be clustered
2.  assigned <- empty       // Map (assigned) docs to cluster nodes
3.  clusters <- empty       // Map (seed) docs to cluster nodes
4.  other <- empty          // Special node with docs not forming
                               clusters
5.  for (i=0; i < DOCS.size; i++) do
6.     if (i in assigned) then continue;
7.     select document di
8.     select document dj from DOCS that is most similar to di (but
          different from di)
9.     if ( similarity(di, dj) < COS) {// This document does not form
          any clusters
10.       other.add(i);
11.       assigned.put(i, other);
12.       continue; }
13.    if (j in assigned) then {
14.       node = assigned.get(j);
15.       node.add(i);               // add doc i to node
             mapped by j
16.       assigned.put(i, node);     // map this node from doc
             i
17.       continue; }
18.    if (i > j) then {              // j in clusters
19.       node = clusters.get(j);
20.       node.add(i);               // add doc i to node
             mapped by j
21.       assigned.put(i, node);     // map this node from doc
             i
22.       continue; }
23.    // i < j, i.e. j never tested before. Initialize new cluster node
24.    create new node;
25.    node.add(i);                   // add doc i to the new node
26.    clusters.put(i, node);         // map this node from doc i
27.    node.add(j);                   // add doc j to the new node
28.    assigned.put(j, node);         // map this node from doc j
29.    continue for loop;
30. Sort clusters according to their sizes.
31. Optional: trim small clusters, and add documents from trimmed
       clusters to the 'other' node.
32. Optional: trim to the maximum number of clusters, and add
       documents from trimmed clusters to the 'other' node.
33. Optional: classify the 'other' documents to clusters.
```

The functionality of the above-listed pseudo-code will be illustrated by way of an example involving a collection of eight documents represented in a conceptual representation space, such as an LSI space. This example is presented for illustrative purposes only, and not limitation. It should be appreciated that a collection of documents may include more than eight documents. For example, the SimSort algorithm may be used to cluster a collection of documents that includes a large number of documents, such as hundreds of documents, thousands of documents, millions of documents, or some other number of documents.

Figure 11A:
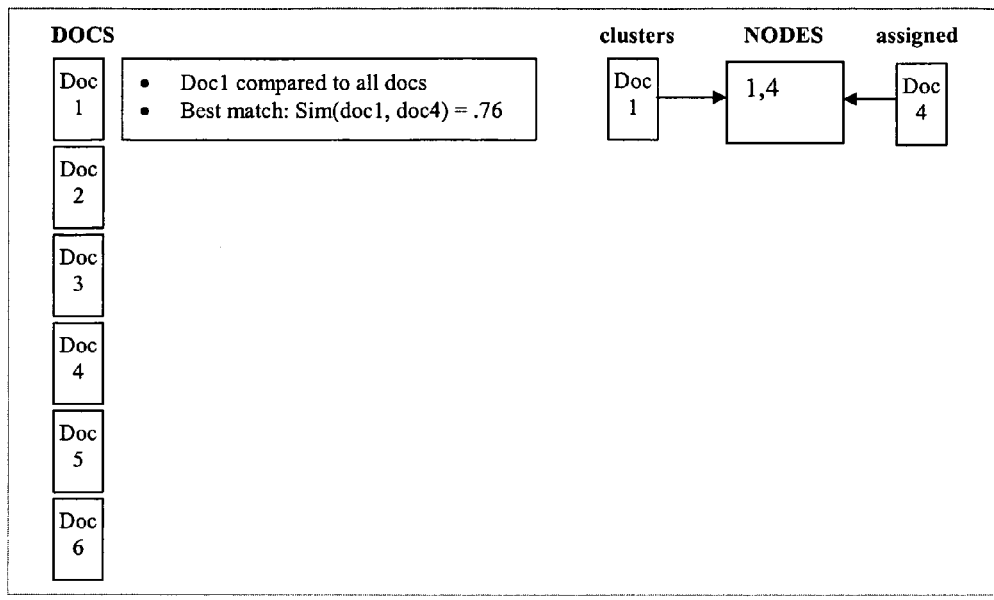
Figure 11B:
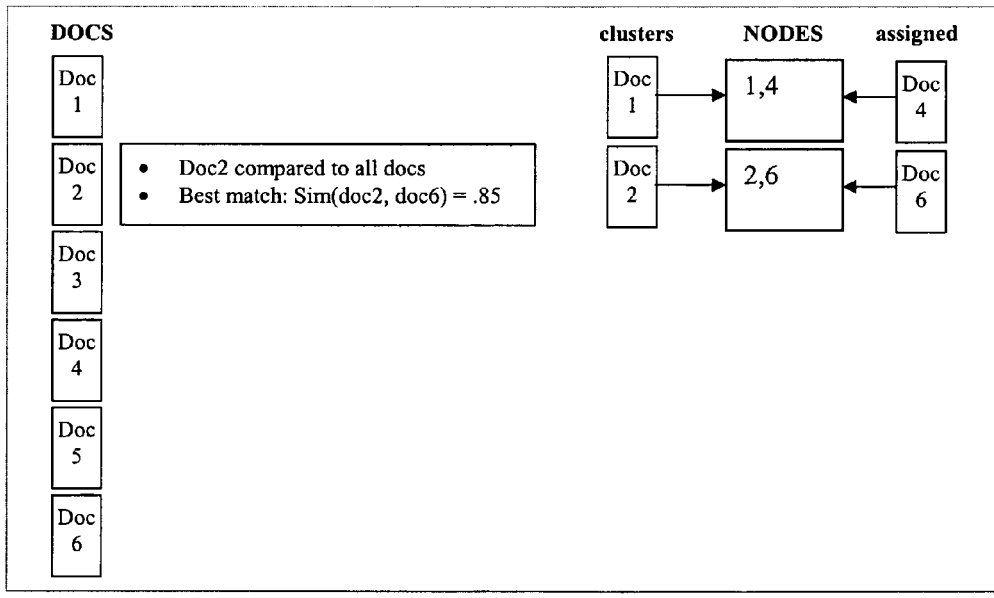

The SimSort algorithm compares the conceptual similarity between documents in the collection of documents on a document-by-document basis by comparing a document i to other documents j, as set forth in line 5 of the pseudo-code. As illustrated in FIG. 11A in which i is equal to 1, the SimSort algorithm compares the conceptual similarity of document 1 with documents 2 through 8. Suppose that the conceptual similarity between document 1 and document 4 is the greatest, and it exceeds a minimum conceptual similarity (denoted COS in the pseudo-code). In this case, the conditional commands listed in lines 24 through 28 are invoked because document 1 (i.e., document i) is less than document 4 (i.e., document j). Documents 1 and 4 will be added to a node in accordance with lines 25 and 27, respectively. Document 1 will receive a "clusters" mapping in accordance with line 26 (because document 1 is the document about which document 4 clusters), and document 4 will receive an "assigned" mapping in accordance with line 28 (because document 4 is assigned to the cluster created by document 1).

As illustrated in FIG. 1B in which i is equal to 2, the SimSort algorithm compares the conceptual similarity of document 2 with documents 1 and documents 3 through 8. Suppose that the conceptual similarity between document 2 and document 6 is greatest, and it exceeds the minimum conceptual similarity. In this case, the conditional commands listed in lines 24 through 28 are invoked because document 2 (i.e., document i) is less than document 6 (i.e., document j). Documents 2 and 6 will be added to a second node in accordance with lines 25 and 27, respectively. Document 2 will receive a "clusters" mapping in accordance with line 26 (because document 2 is the document about which document 6 clusters), and document 6 will receive an "assigned" mapping in accordance with line 28 (because document 6 is assigned to the cluster created by document 2).

Figure 11C:
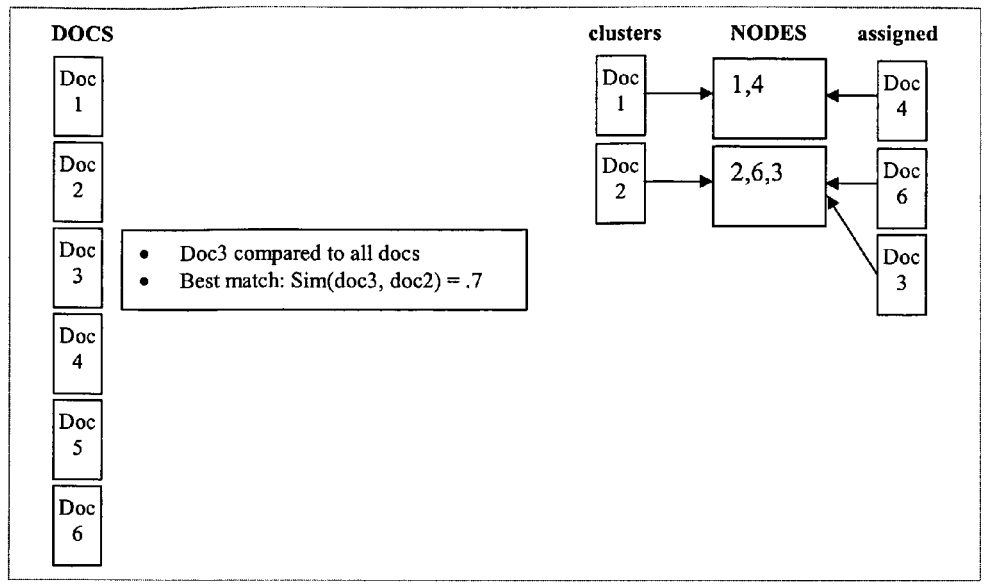

As illustrated in FIG. 11C in which i is equal to 3, the SimSort algorithm compares the conceptual similarity of document 3 with documents 1, 2 and 4 through 8. Suppose that the conceptual similarity between document 3 and document 2 is greatest, and it exceeds the minimum conceptual similarity. In this case, the conditional commands listed in lines 19 through 22 are invoked because document 3 (i.e., document i) is greater than document 2 (i.e., document j), and document 3 will be added to this node. First, the SimSort algorithm retrieves the node created by document 2 in accordance with line 19, and then document 3 is added to this node with an "assigned" mapping in accordance with lines 20 and 21.

For the fourth instance in which i is equal to 4, the SimSort algorithm does not compare document 4 to any of the other documents in the collection of documents. Document 4 received an "assigned" mapping to the node created by document 1, as described above. Because document 4 is already "assigned," the SimSort algorithm goes on to the next document in the collection in accordance with line 6.

Figure 11D:
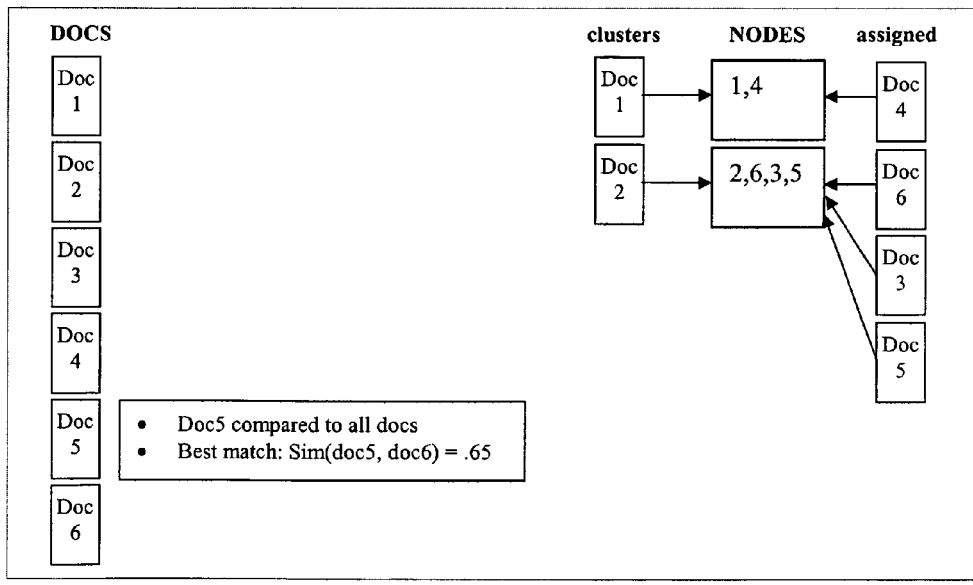

As illustrated in FIG. 11D in which i is equal to 5, the SimSort algorithm compares the conceptual similarity of document 5 with documents 1 through 4 and documents 6 through 8. Suppose that the conceptual similarity between document 5 and document 6 is greatest, and it exceeds the minimum conceptual similarity. In this case, the conditional commands listed in lines 14 through 17 are invoked because document 6 (i.e., document j) is already "assigned" to the node created by document 2, and document 5 will be added to this node. First, the SimSort algorithm retrieves the node created by document 2 in accordance with line 14, and then document 5 is added to this node with an "assigned" mapping in accordance with lines 15 and 16.

For the sixth instance in which i is equal to 6, the SimSort algorithm does not compare document 6 to any of the other documents in the collection of documents, because document 6 already received an "assigned" mapping to the node created by document 2. In other words, document 6 is processed in a similar manner to that described above with respect to document 4.

Figure 11E:
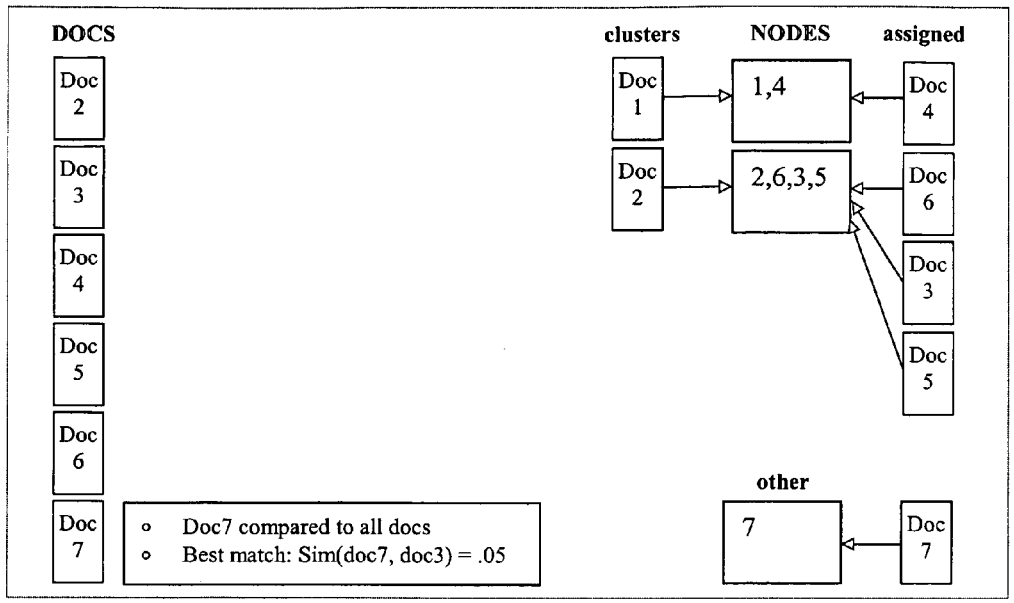

As illustrated in FIG. 11E in which i is equal to 7, the SimSort algorithm compares the conceptual similarity of document 7 with documents 1 through 6 and document 8. Suppose that the conceptual similarity between document 7 and document 3 is greatest, but it does not exceed the minimum conceptual similarity. In this case, the conditional commands in lines 10 through 12 are invoked because the conceptual similarity between the documents does not exceed the predetermined threshold (denoted COS in the pseudo-code). As a result, document 7 will be added to a third node, labeled "other."

Figure 11F:
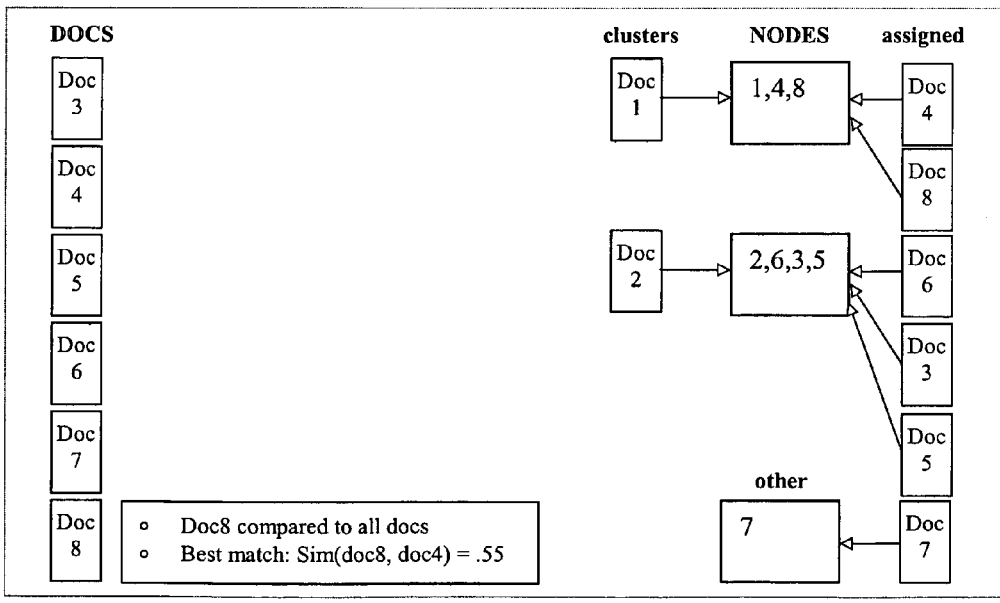

As illustrated in FIG. 11F in which i is equal to 8, the SimSort algorithm compares the conceptual similarity of document 8 with documents 1 through 7. Suppose that the conceptual similarity between document 8 and document 4 is greatest, and it exceeds the minimum conceptual similarity. In this case, the conditional commands listed in lines 14 through 17 are invoked because document 4 (i.e., document j) is already "assigned" to the node created by document 1, and document 8 will be added to this node. First, the SimSort algorithm retrieves the node created by document 1 in accordance with line 14, and then document 8 is added to this node with an "assigned" mapping in accordance with lines 15 and 16.

After processing all the documents in the collection, the clusters are sorted by size in accordance with line 30. In the example from above, the cluster created by document 2 will be sorted higher than the cluster created by document 1 because the cluster created by document 2 includes four documents (namely, documents 2, 3, 5 and 6), whereas the cluster created by document 1 only includes three documents (namely, documents 1, 4 and 8). In addition to sorting the clusters, the optional commands listed in lines 31 through 33 may be implemented. For example, document 7 could be added to the cluster created by document 2 because document 7 is most conceptually similar to a document included in that cluster—namely, document 3.

The SimSort algorithm produces non-intersecting clusters for a given level in a hierarchy. The clustering may be continued for all document subsets collected in the "nodes." In addition, documents identified in the "clusters" map can be utilized as seed exemplars for other purposes, such as indexing or categorization.

B. Stand-Alone Incremental Clustering Embodiment

In another embodiment, the SimSort algorithm may receive a pre-existing taxonomy or hierarchical structure and transform it into a suitable form for incremental enhancement with new documents. This embodiment utilizes the fact that any text can be represented in a unified form in an abstract mathematical space. Due to document normalization, short and long descriptions can be matched with each other. Moreover, groups of documents may be represented by a centroid vector that combines document vectors within a group.

In this embodiment, input is received in the form of a list of documents and cluster structure with nodes. The cluster structure may be defined using a keyword or phrase, such as a title of the cluster. Alternatively, the cluster structure may be defined using a centroid vector that represents a group of documents. In addition, an alternative manner of defining the cluster structure may be used as would be apparent to a person skilled in the relevant art(s) from reading the description contained herein. The output in this embodiment comprises a new cluster structure or refined cluster structure.

In this embodiment, the textual representation of the cluster structure is transformed into a hierarchy of centroid vectors. Then, the SimSort algorithm is applied to match and merge documents on the document list with the hierarchy. The hierarchy is traversed in a breadth-first fashion, with the SimSort algorithm applied to each cluster node and the list of documents. The direct sub-nodes are used for initializing SimSort's: "NODES," "clusters," and "assigned" data structures. The documents from the list are either assigned to existing sub-nodes of the given node or SimSort creates new cluster nodes. At the top node, all input documents are processed. The successive nodes reprocess only a portion of new documents assigned to them at a higher level.

V. EXAMPLE COMPUTER SYSTEM IMPLEMENTATION

Various aspects of the present invention can be implemented by software, firmware, hardware, or a combination thereof. FIG. 12 illustrates an example computer system 1200 in which an embodiment of the present invention, or portions thereof, can be implemented as computer-readable code. For example, the methods illustrated by flowcharts 100, 200, 300, 500, 600, 800 and/or 1000 can be implemented in system 1200. Various embodiments of the invention are described in terms of this example computer system 1200. After reading this description, it will become apparent to a person skilled in the relevant art how to implement the invention using other computer systems and/or computer architectures.

Computer system 1200 includes one or more processors, such as processor 1204. Processor 1204 can be a special purpose or a general purpose processor. Processor 1204 is connected to a communication infrastructure 1206 (for example, a bus or network).

Computer system 1200 also includes a main memory 1208, preferably random access memory (RAM), and may also include a secondary memory 1210. Secondary memory 1210 may include, for example, a hard disk drive 1212 and/or a removable storage drive 1214. Removable storage drive 1214 may comprise a floppy disk drive, a magnetic tape drive, an optical disk drive, a flash memory, or the like. The removable storage drive 1214 reads from and/or writes to a removable storage unit 1218 in a well known manner. Removable storage unit 1218 may comprise a floppy disk, magnetic tape, optical disk, etc. which is read by and written to by removable storage drive 1214. As will be appreciated by persons skilled in the relevant art(s), removable storage unit 1218 includes a computer usable storage medium having stored therein computer software and/or data.

In alternative implementations, secondary memory 1210 may include other similar means for allowing computer programs or other instructions to be loaded into computer system 1200. Such means may include, for example, a removable storage unit 1222 and an interface 1220. Examples of such means may include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1200.

Computer system 1200 may also include a communications interface 1224. Communications interface 1224 allows software and data to be transferred between computer system 1200 and external devices. Communications interface 1224 may include a modem, a network interface (such as an Ethernet card), a communications port, a PCMCIA slot and card, or the like. Software and data transferred via communications interface 1224 are in the form of signals 1228 which may be electronic, electromagnetic, optical, or other signals capable of being received by communications interface 1224. These signals 1228 are provided to communications interface 1224 via a communications path 1226. Communications path 1226 carries signals 1228 and may be implemented using wire or cable, fiber optics, a phone line, a cellular phone link, an RF link or other communications channels.

In this document, the terms "computer program medium" and "computer usable medium" are used to generally refer to media such as removable storage unit 1218, removable storage unit 1222, a hard disk installed in hard disk drive 1212, and signals 1228. Computer program medium and computer usable medium can also refer to memories, such as main memory 1208 and secondary memory 1210, which can be memory semiconductors (e.g. DRAMs, etc.). These computer program products are means for providing software to computer system 1200.

Computer programs (also called computer control logic) are stored in main memory 1208 and/or secondary memory 1210. Computer programs may also be received via communications interface 1224. Such computer programs, when executed, enable computer system 1200 to implement the present invention as discussed herein. In particular, the computer programs, when executed, enable processor 1204 to implement the processes of the present invention, such as the steps in the methods illustrated by flowcharts 100, 200, 300, 500, 600, 800 and/or 1000 discussed above. Accordingly, such computer programs represent controllers of the computer system 1200. Where the invention is implemented using software, the software may be stored in a computer program product and loaded into computer system 1200 using removable storage drive 1214, interface 1220, hard drive 1212 or communications interface 1224.

The invention is also directed to computer products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage device, etc.), and communication mediums (e.g., wired and wireless communications networks, local area networks, wide area networks, intranets, etc.).

VI. EXAMPLE CAPABILITIES AND APPLICATIONS

The embodiments of the present invention described herein have many capabilities and applications. The following example capabilities and applications are described below: monitoring capabilities; categorization capabilities; output, display and/or deliverable capabilities; and applications in specific industries or technologies. These examples are presented by way of illustration, and not limitation. Other capabilities and applications, as would be apparent to a person having ordinary skill in the relevant art(s) from the description contained herein, are contemplated within the scope and spirit of the present invention.

MONITORING CAPABILITIES. Embodiments of the present invention can be used to monitor different media outlets to identify an item and/or information of interest. For example, an embodiment of the present invention can be used to automatically organize the item and/or information into non-intersecting clusters. By way of illustration, and not limitation, the item and/or information of interest can include, a particular brand of a good, a competitor's product, a competitor's use of a registered trademark, a technical development, a security issue or issues, and/or other types of items either tangible or intangible that may be of interest. The types of media outlets that can be monitored can include, but are not limited to, email, chat rooms, blogs, web-feeds, websites, magazines, newspapers, and other forms of media in which information is displayed, printed, published, posted and/or periodically updated.

Information gleaned from monitoring the media outlets can be used in several different ways. For instance, the information can be used to determine popular sentiment regarding a past or future event. As an example, media outlets could be monitored to track popular sentiment about a political issue. This information could be used, for example, to plan an election campaign strategy.

CATEGORIZATION CAPABILITIES. The non-intersecting document clusters identified in accordance with an embodiment of the present invention can also be used to generate a categorization of items. Example applications in which embodiments of the present invention can be coupled with categorization capabilities can include, but are not limited to, employee recruitment (for example, by matching resumes to job descriptions), customer relationship management (for example, by characterizing customer inputs and/or monitoring history), call center applications (for example, by working for the IRS to help people find tax publications that answer their questions), opinion research (for example, by categorizing answers to open-ended survey questions), dating services (for example, by matching potential couples according to a set of criteria), and similar categorization-type applications.

OUTPUT, DISPLAY AND/OR DELIVERABLE CAPABILITIES. Non-intersecting document clusters identified in accordance with an embodiment of the present invention and/or products that use non-intersecting document clusters identified in accordance with an embodiment of the present invention can be output, displayed and/or delivered in many different manners. Example outputs, displays and/or deliverable capabilities can include, but are not limited to, an alert (which could be emailed to a user), a map (which could be color coordinated), an unordered list, an ordinal list, a cardinal list, cross-lingual outputs, and/or other types of output as would be apparent to a person having ordinary skill in the relevant art(s) from reading the description contained herein.

APPLICATIONS IN TECHNOLOGY, INTELLECTUAL PROPERTY AND PHARMACEUTICALS INDUSTRIES. The identification of non-intersecting document clusters described herein, and their utility in generating an index, categorization, a taxonomy, or the like, can be used in several different industries, such as the Technology, Intellectual Property (IP) and Pharmaceuticals industries. Example applications of embodiments of the present invention can include, but are not limited to, prior art searches, patent/application alerting, research management (for example, by identifying patents and/or papers that are most relevant to a research project before investing in research and development), clinical trials data analysis (for example, by analyzing large amount of text generated in clinical trials), and/or similar types of industry applications.

VII. CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A computer-based method for automatically identifying clusters of conceptually-related documents in a collection of documents, comprising:
   (a) generating a document-representation of each document in an abstract mathematical space;
   (b) identifying a plurality of document clusters in the collection of documents based on a conceptual similarity between respective pairs of the document-representations, wherein each document cluster is associated with an exemplary document and a plurality of other documents; and
   (c) identifying a non-intersecting document cluster from among the plurality of document clusters based on (i) a conceptual similarity between the document-representation of the exemplary document and the document-representation of each document in the non-intersecting cluster and (ii) a conceptual dissimilarity between a cluster-representation of the non-intersecting document cluster and a cluster-representation of each other document cluster, wherein step (c) comprises,
      (c1) identifying a non-intersecting document cluster from among the plurality of document clusters if (i) a conceptual similarity between the document-representation of the exemplary document and the document-representation of each document in the non-intersecting cluster is above a predefined similarity threshold and (ii) a conceptual dissimilarity between a cluster-representation of the non-intersecting document cluster and a cluster-representation of each other document cluster is above a predefined dissimilarity threshold; and
   (d) iteratively adjusting the predefined similarity threshold from a maximum similarity level to a minimum similarity level via a predefined similarity increment;
   (e) iteratively adjusting the predefined dissimilarity threshold from a minimum dissimilarity level to a maximum dissimilarity level via a predefined dissimilarity increment; and
   (f) repeating step (c1) for each similarity level and each dissimilarity level.

2. The method of claim 1, wherein step (b) comprises:
   (b1) identifying a plurality of document clusters in the collection of documents based on a conceptual similarity between respective pairs of the document-representations; and
   (b2) generating a cluster-representation of each document cluster in the plurality of document clusters, wherein each cluster-representation is associated with an exemplary document and a plurality of other documents.

3. The method of claim 1, wherein generating a document-representation of each document in an abstract mathematical space comprises:
   generating a vector representation of each document in a Latent Semantic Indexing (LSI) space.

4. The method of claim 3, wherein identifying a plurality of document clusters in the collection of documents based on a conceptual similarity between pairs of the document-representations comprises:
   identifying a plurality of document clusters in the collection of documents based on a cosine similarity between pairs of the document-representations.

5. A computer program product for automatically identifying clusters of conceptually-related documents in a collection of documents, comprising:
   a computer usable medium having computer readable program code embodied in said medium for causing an application program to execute on an operating system of a computer, said computer readable program code comprising:
   computer readable first program code that causes the computer to generate a document-representation of each document in an abstract mathematical space;
   computer readable second program code that causes the computer to identify a plurality of document clusters in the collection of documents based on a conceptual similarity between respective pairs of the document-representations, wherein each document cluster includes an exemplary document and a plurality of other documents; and
   computer readable third program code that causes the computer to identify a non- intersecting document cluster from among the plurality of document clusters based on (i) a conceptual similarity between the document-representation of the exemplary document and the document-representation of each document in the non-intersecting cluster and (ii) a conceptual dissimilarity between a cluster-representation of the non-intersecting document cluster and a cluster-representation of each other document cluster, wherein the computer readable third program code comprises,
   code that causes the computer to identify a non-intersecting document cluster from among the plurality of document clusters if (i) a conceptual similarity between the document-representation of the exemplary document and the document-representation of each document in the non-intersecting cluster is above a predefined similarity threshold and (ii) a conceptual dissimilarity between a cluster-representation of the non-intersecting document cluster and a cluster-representation of each other document cluster is above a predefined dissimilarity threshold; and computer readable fourth program code that causes the computer to iteratively adjust the predefined similarity threshold from a maximum similarity level to a minimum similarity level via a predefined similarity increment;

computer readable fifth program code that causes the computer to iteratively adjust the predefined dissimilarity threshold from a minimum dissimilarity level to a maximum dissimilarity level via a predefined dissimilarity increment; and computer readable sixth program code that causes the computer to repeat the third computer readable program code means for each similarity level and each dissimilarity level.

6. The computer program product of claim 5, wherein the computer readable second program code comprises:

code that causes the computer to identify a plurality of document clusters in the collection of documents based on a conceptual similarity between respective pairs of the document-representations; and code that causes the computer to generate a cluster-representation of each document cluster in the plurality of document clusters, wherein each cluster-representation is associated with an exemplary document and a plurality of other documents.

7. The computer program product of claim 5, wherein the computer readable first program code that causes the computer to generate a document-representation of each document in an abstract mathematical space comprises:

code that causes the computer to generate a vector representation of each document in a Latent Semantic Indexing (LSI) space.

8. The computer program product of claim 7, wherein the computer readable second program code that causes the computer to identify a plurality of document clusters in the collection of documents based on a conceptual similarity between pairs of the document-representations comprises:

code that causes the computer to identify a plurality of document clusters in the collection of documents based on a cosine similarity between pairs of the document-representations.

\* \* \* \* \*